(12) United States Patent
Tajiri et al.

(10) Patent No.: US 7,724,222 B2
(45) Date of Patent: May 25, 2010

(54) IMAGE DISPLAY DEVICE AND ELECTRONIC APPARATUS

(75) Inventors: Kenichi Tajiri, Shiojiri (JP); Chiyoaki Iijima, Ina (JP)

(73) Assignee: Epson Imaging Devices Corporation (JP)

( * ) Notice: Subject to any disclaimer, the term of this patent is extended or adjusted under 35 U.S.C. 154(b) by 735 days.

(21) Appl. No.: 11/561,538

(22) Filed: Nov. 20, 2006

(65) Prior Publication Data

US 2007/0115230 A1 May 24, 2007

(30) Foreign Application Priority Data

Nov. 21, 2005 (JP) ............................. 2005-335278
Jan. 24, 2006 (JP) ............................. 2006-015245

(51) Int. Cl.
G09G 3/36 (2006.01)

(52) U.S. Cl. .................... 345/87; 345/6; 345/7; 349/15

(58) Field of Classification Search .................... 345/6, 345/87, 7, 32, 43, 103, 109; 349/15; 348/51; 359/462

See application file for complete search history.

(56) References Cited

U.S. PATENT DOCUMENTS 5,969,850 A 10/1999 Harrold et al.
6,137,456 A * 10/2000 Bhagavatula et al. ........... 345/7
7,453,529 B2 * 11/2008 Nam et al. .................... 349/15
2007/0046564 A1 * 3/2007 Kim et al. ....................... 345/6

FOREIGN PATENT DOCUMENTS

JP   10-142572   5/1998
JP   2857429     11/1998

* cited by examiner

Primary Examiner—Amare Mengistu
Assistant Examiner—Dmitriy Bolotin
(74) Attorney, Agent, or Firm—Harness, Dickey & Pierce, P.L.C.

(57) ABSTRACT

An image display device includes: pixels in first and second directions; a polarization controller providing first and second polarization axis light; and a controller. The polarization controller includes first electrodes extending in the first direction on a first substrate with a predetermined interval in the second direction, and second electrodes extending in the first direction on a second substrate with an interval in the second direction twice the predetermined interval. The controller switches display between dual-screen and three-dimensional modes. In the dual-screen mode, the controller applies voltages to the second electrodes so adjacent electrodes have opposite phases, and applies the same phase voltage as one of the second electrode voltages to the first electrodes. In the three-dimensional mode, the controller applies voltages to the first electrodes so adjacent electrodes have opposite phases, and applies the same phase voltage as one of the first electrode voltages to the second electrodes.

5 Claims, 19 Drawing Sheets

IMAGE DISPLAY DEVICE AND ELECTRONIC APPARATUS

BACKGROUND

1. Technical Field

The present invention relates to image display devices and electronic apparatuses, and more particularly to an image display device provided with a polarization axis controller and to an electronic apparatus.

2. Related Art

One known method for an image display device displaying a three-dimensional stereo image is a system employed in a three-dimensional image display device disclosed in Japanese Patent No. 2,857,429.

In the three-dimensional image display device disclosed in Japanese Patent No. 2,857,429, an electronic parallax barrier disposed on a viewer side of an image display surface is controlled by a controller, such as a microcomputer, thereby forming apertures and light-blocking portions of the electronic parallax barrier so that an image for the left eye enters the left eye of the viewer and an image for the right eye enters the right eye of the viewer.

However, since the electronic parallax barrier is disposed on the viewer side of the image display surface of the three-dimensional image display device disclosed in Japanese Patent No. 2,857,429, part of light emitted from the image display surface is blocked by the light-blocking portions of the electronic parallax barrier. As a result, the luminance of an image viewed by the viewer is reduced, and the image seems dark to the viewer.

A known dual-screen display device is available for providing different images to viewers at different viewing positions by disposing a barrier having slit apertures and light-blocking portions on a viewer side of a display panel. This type of display device is disadvantageous in that part of light emitted from the display panel is blocked by the barrier, and, as a result, an image seems dark.

SUMMARY

An advantage of some aspects of the invention is that it provides an image display device capable of displaying a three-dimensional image and functioning as a dual-screen display without reducing the luminance of an image viewed by viewers.

According to an aspect of the invention, an image display device includes the following elements: a display panel that has a plurality of pixels arranged in a predetermined first direction and in a second direction intersecting with the first direction; a light source that emits light to the display panel; a polarization axis controller that separates the light emitted from the light source into light with a first polarization axis and light with a second polarization axis different from the first polarization axis, the polarization axis controller being disposed between the display panel and the light source; and an optical element that directs the light emitted from the light source in a direction substantially orthogonal to the first direction, the optical element being disposed between the display panel and the polarization axis controller. The polarization axis controller includes the following elements: a first substrate; a second substrate; a liquid crystal layer held between the first substrate and the second substrate; a plurality of first electrodes disposed on the first substrate so as to extend in the first direction, the plurality of first electrodes being arranged at a predetermined interval in the second direction; and a plurality of second electrodes disposed on the second substrate so as to extend in the first direction, the plurality of second electrodes being arranged at an interval twice the predetermined interval in the second direction. The plurality of second electrodes is disposed so as to overlap at least part of the adjacent first electrodes.

With the structure of the aspect of the invention, part of light emitted from the display panel is not blocked by a barrier, and hence the luminance of an image viewed by viewers is not reduced. By controlling the state in which voltages are applied to the plurality of first electrodes and the plurality of second electrodes of the polarization axis controller, the length in the second direction of first and second polarization-controlled areas can be controlled. Accordingly, the direction in which light is directed can be switched using the optical element, and a display mode can be switched between a three-dimensional image display mode and a dual-screen display mode.

It is preferable that the plurality of first electrodes be a plurality of strip electrodes of a pair of comb-like electrodes having a pair of connecting portions disposed along an outer periphery of the first substrate and the plurality of strip electrodes extending alternately from the pair of connecting portions inward of the first substrate, and that the plurality of second electrodes be a plurality of strip electrodes of a pair of comb-like electrodes having a pair of connecting portions disposed along an outer periphery of the second substrate and the plurality of strip electrodes extending alternately from the pair of connecting portions inward of the second substrate.

With this structure, two electrodes to which different voltages are applied can be fabricated using a single electrically-conductive layer on each substrate, and hence a polarization-controlled liquid crystal panel can be easily fabricated.

It is also preferable that the image display device further include a controller that switches an image display mode between a dual-screen display mode and a three-dimensional image display mode by controlling voltages applied to the plurality of first electrodes and the plurality of second electrodes.

In this case, in the dual-screen display mode, the controller preferably applies voltages to the plurality of second electrodes so that the adjacent electrodes have opposite phases, and, to the plurality of first electrodes, preferably applies a voltage having the same phase as one of the voltages applied to the plurality of second electrodes. In the three-dimensional image display mode, the controller preferably applies voltages to the plurality of first electrodes so that the adjacent electrodes have opposite phases, and, to the plurality of second electrodes, preferably applies a voltage having the same phase as one of the voltages applied to the plurality of first electrodes.

With this structure, the controller can be constructed using a combination of a simple known electrical circuit, and hence the controller can be easily fabricated.

In this case, it is preferable that the controller apply the voltages to the plurality of first electrodes so that the adjacent electrodes have opposite phases and, to the second electrodes, apply a voltage with a period half that of the voltages applied to the plurality of first electrodes, thereby switching the image display mode to a two-dimensional image display mode.

With this structure, the image display device capable of displaying a fine two-dimensional image can be realized.

It is also preferable that the controller apply the voltages to the plurality of second electrodes so that the adjacent electrodes have opposite phases, and, to the plurality of first electrodes, apply a voltage having the same phase as the other voltage applied to the plurality of second electrodes, thereby switching the image display mode to a second dual-screen display mode.

With this structure, images provided to viewers at different viewing positions can be switched without switching the positions at which the images are displayed on the display panel. Therefore, no image processing is necessary therefor, and no delay occurs in displaying the images when the directions in which the images are provided are switched.

According to another aspect of the invention, an electronic apparatus includes the above-described image display device.

With the structure of the aspect of the invention, a three-dimensional image with a high luminance can be displayed, while a dual-screen display can be realized.

BRIEF DESCRIPTION OF THE DRAWINGS

The invention will be described with reference to the accompanying drawings, wherein like numbers reference like elements, and wherein.

DESCRIPTION OF EXEMPLARY EMBODIMENTS

A first embodiment of the invention will be described with reference to FIGS. 1 to 17.

An image display device 1 of the first embodiment has three image display modes, namely, a dual-screen display mode in which different images are provided to viewers 10 and 20 residing at different viewing positions, a three-dimensional image display mode in which a three-dimensional image is provided to the viewers 10 and 20, and a two-dimensional image display mode in which one and the same two-dimensional image is provided to the viewers 10 and 20. By switching among these image display modes, the image display device 1 can provide images in various modes.

Figure 1:
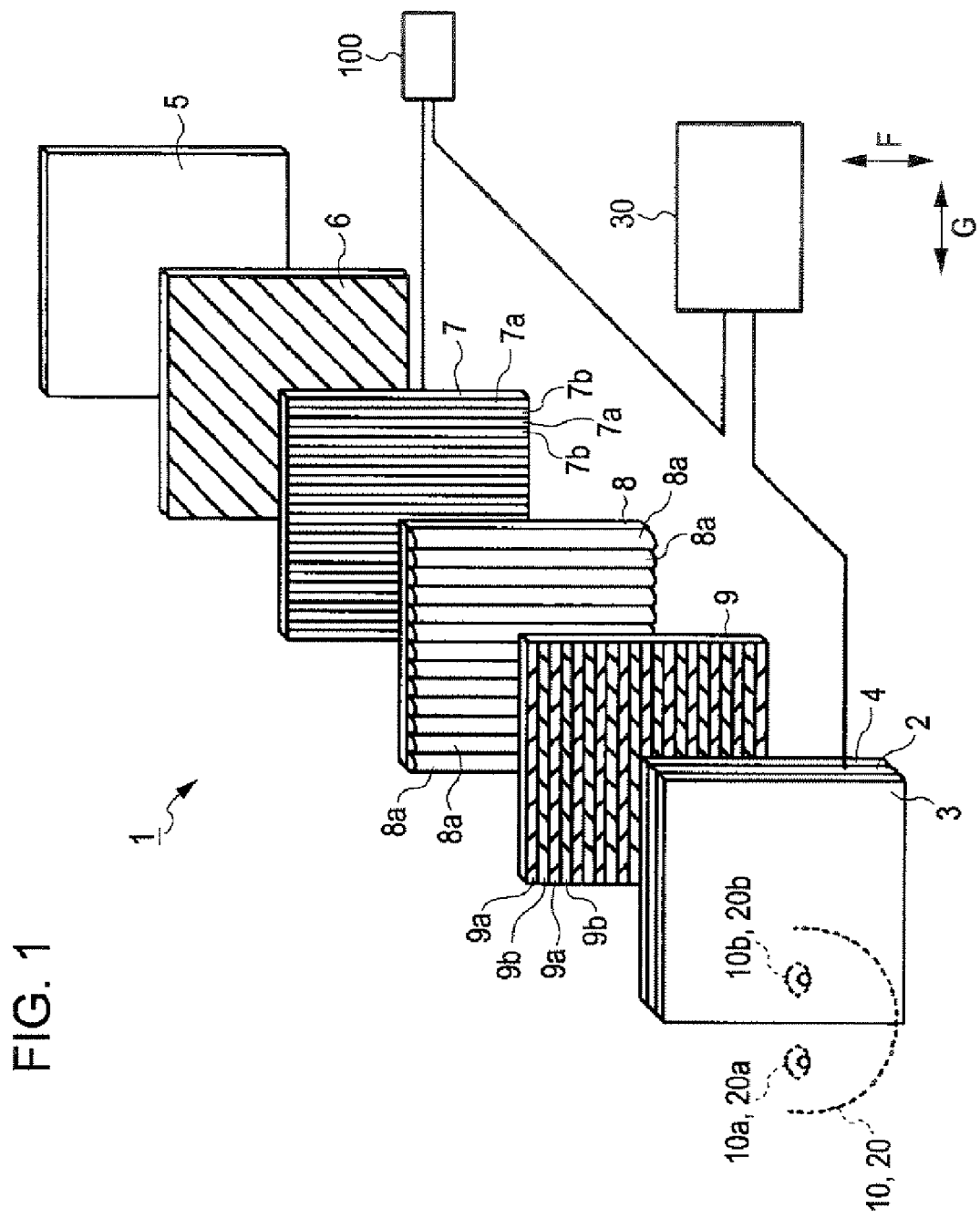
FIG. 1 is an exploded perspective view of an image display device.
Figure 2:
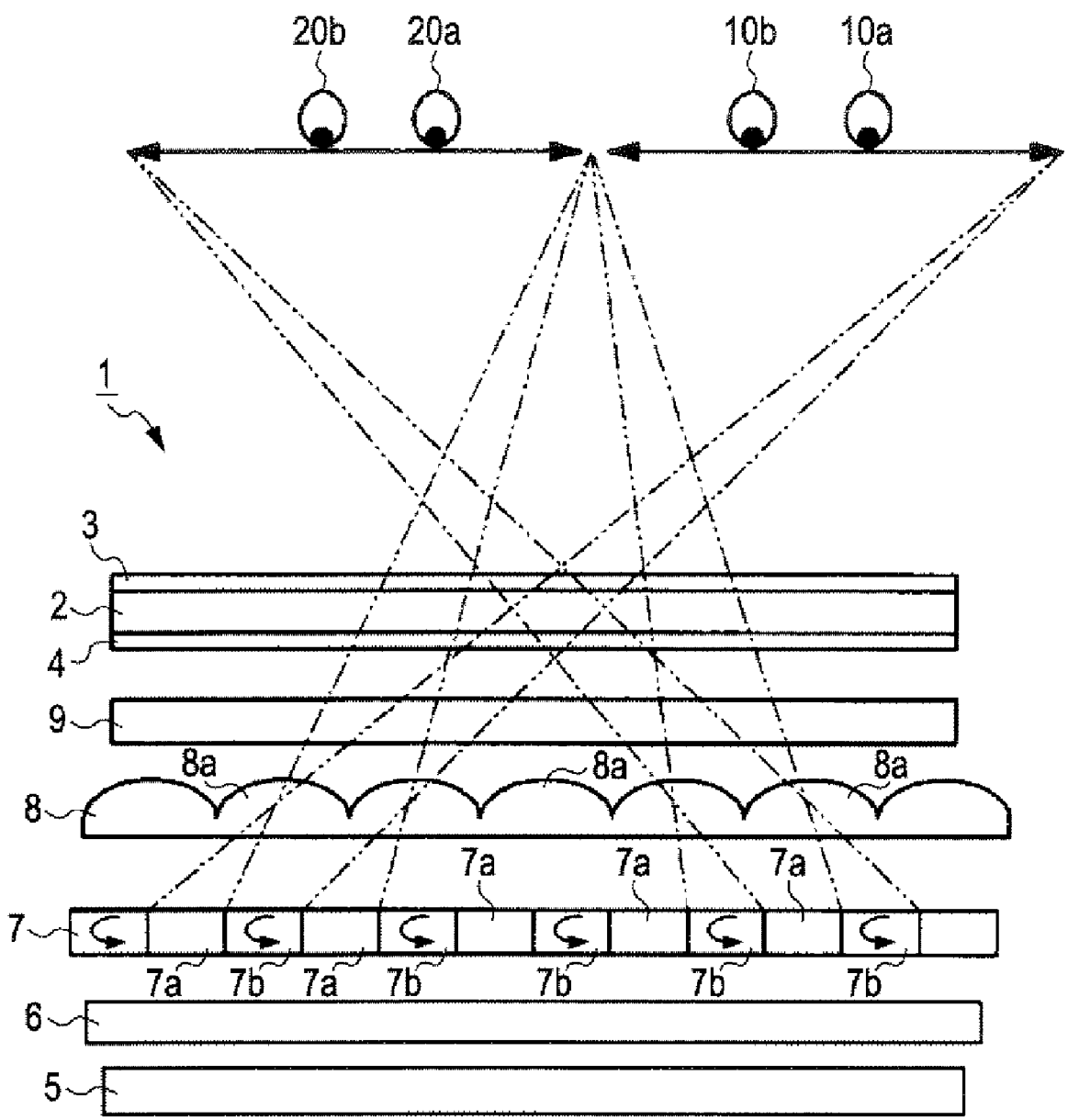
FIG. 2 is a view of a display panel viewed from the top by viewers for describing the principle of the image display device.
Figure 3:
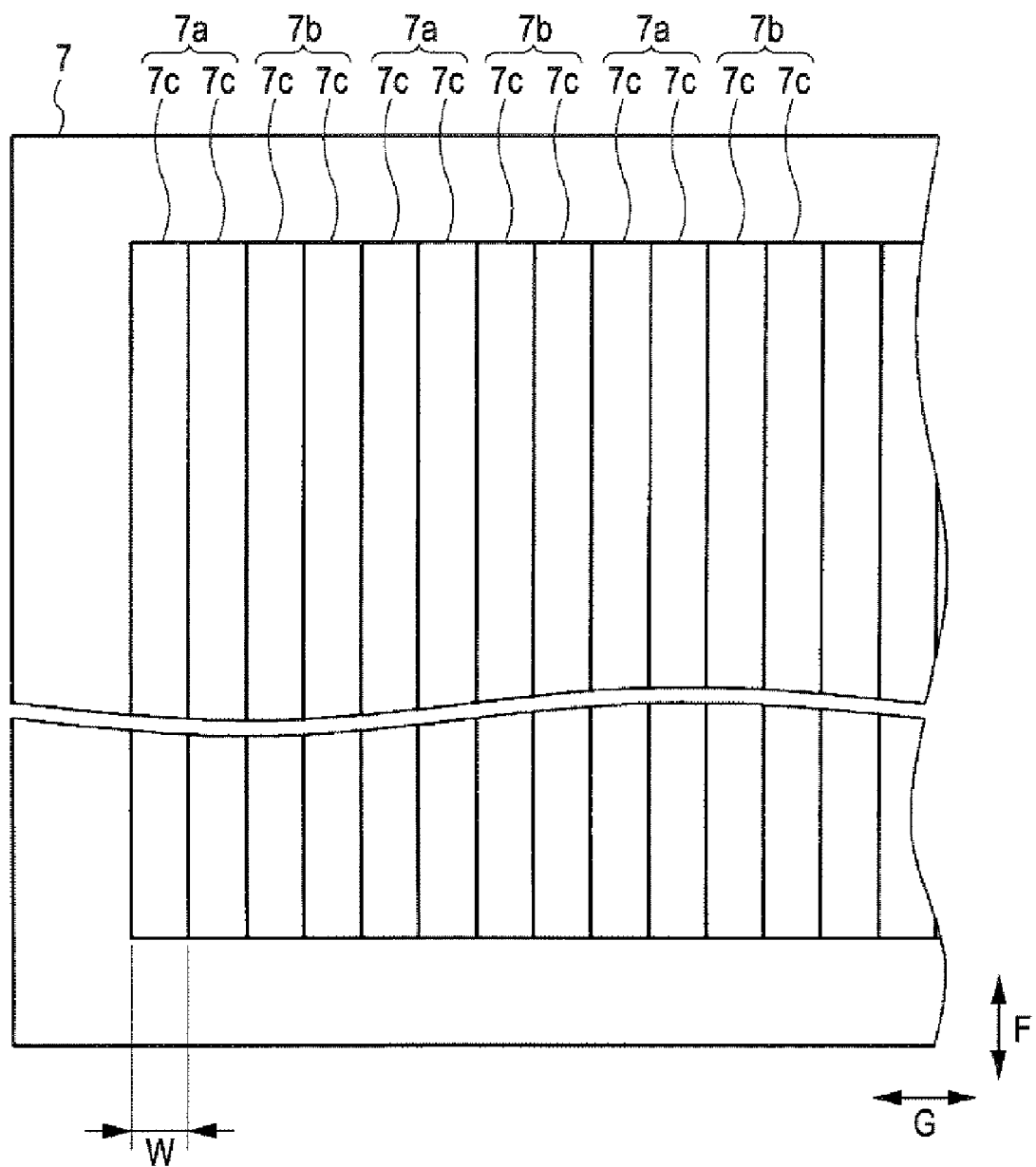
FIG. 3 is a partly enlarged view of a polarization-controlled liquid crystal panel.

The structure of the image display device 1 of the first embodiment will be described. FIG. 1 is an exploded perspective view of the image display device of the first embodiment. FIG. 2 is a view of a display panel viewed from the top by the viewers for describing the principle of the image display device of the first embodiment shown in FIG. 1. FIG. 3 is a partly enlarged view of a polarization-controlled liquid crystal panel of the image display device shown in FIG. 1. The image display device 1 includes, as shown in FIGS. 1 and 2, a display panel 2 for displaying an image, polarization plates 3 and 4 disposed so as to have the display panel 2 therebetween, a backlight 5 for irradiating the display panel 2 with light, and a polarization plate 6 disposed on the side of the backlight 5 facing the viewers 10 and 20 (see FIG. 2). The polarization plates 3 and 4 disposed so as to have the display panel 2 therebetween have polarization axes, namely, a first polarization axis and a second polarization axis, that are orthogonal to each other. The polarization plate 4 has a function of allowing light with the first polarization axis to pass through and absorbing light with the second polarization axis, which is substantially orthogonal to the first polarization axis. The polarization plate 3 has a function of allowing light with the second polarization axis, which is substantially orthogonal to the first polarization axis, to pass through and absorbing light with the first polarization axis. A combination of the display panel 2 and the polarization plates 3 and 4 corresponds to a so-called transmissive liquid crystal panel having a matrix of pixels arranged in an F direction and a G direction, which are orthogonal to each other. The polarization plate 6 is constructed to allow, of the light emitted from the backlight 5, the light with the first polarization axis to pass through. The display panel 2 is connected to a controller 30 and can display an image by changing optical characteristics of each pixel in accordance with an image signal from the controller 30. The controller 30 renders image data input from an external device (not shown) to the image display device 1 and generates an image signal.

The controller 30 is electrically connected to a drive circuit 100 of the a polarization-controlled liquid crystal panel 7, which will be described below, and outputs a switching signal to the drive circuit 100 in accordance with a change in the image display mode. In the first embodiment, the switching signal is output on the basis of a command input from an external device (not shown) connected to the image display device 1 to the controller 30. A command to change the image display mode may be input manually by the viewer 10 or 20 via an input device such as a switch (not shown) or may be included in image data input to the image display device 1. The controller 30 may be provided externally to the image display device 1.

The polarization-controlled liquid crystal panel 7 is disposed on the side of the polarization plate 6 facing the viewers 10 and 20. The polarization-controlled liquid crystal panel 7 is, as shown in FIG. 3, a liquid crystal panel having two transparent substrates between which liquid crystal is held. The polarization-controlled liquid crystal panel 7 has a plurality of strip-shaped unit areas 7c arranged at pitch W in the G direction, where the F direction serves as the longitudinal direction. The polarization-controlled liquid crystal panel 7 is connected to the drive circuit 100. The unit areas 7c enter one of two states by changing the liquid crystal alignment in the unit areas 7c on the basis of a signal from the drive circuit 100. The two states are a transmissive state where light with the first polarization axis is allowed to pass through and a polarization state where light with the first polarization axis is changed to light with the second polarization axis, which is substantially orthogonal to the first polarization axis. The drive circuit 100 is connected to the controller 30 and controls the state of the unit areas 7c on the basis of a switching signal from the controller 30.

The polarization-controlled liquid crystal panel 7 alternately changes the state of the unit areas 7c between the transmissive state and the polarization state in units of one or two unit areas 7c. As a result, the polarization-controlled liquid crystal panel 7 has polarization-controlled areas 7a for allowing light with the first polarization axis, which is emitted from the backlight 5 via the polarization plate 6, to pass through, and polarization-controlled areas 7b for changing the light from having the first polarization axis to having the second polarization axis substantially orthogonal to the first polarization axis. The polarization-controlled areas 7a and 7b of the polarization-controlled liquid crystal panel 7 are alternately disposed in the G direction and extend in a direction substantially orthogonal to a line segment connecting a left eye 10a (20a) and a right eye 10b (20b) of the viewer 10 (20) (perpendicular to the page of FIG. 2 (in the F direction of FIG. 1)).

For example, when the image display device 1 is in the dual-screen display mode, the polarization-controlled liquid crystal panel 7 is controlled so that two adjacent unit areas 7c are in the transmissive state to form one polarization-controlled area 7a and that two next adjacent unit areas 7c are in the polarization state to form one polarization-controlled area 7b (state shown in FIG. 3). For example, when the image display device 1 is in the three-dimensional image display mode, the polarization-controlled liquid crystal panel 7 is controlled so that the unit areas 7c are alternately in the transmissive state and the polarization state to form the polarization-controlled areas 7a and 7b. For example, when the image display device 1 is in the two-dimensional image display mode, the polarization-controlled liquid crystal panel 7 is controlled so that the unit areas 7c are alternately in the transmissive state and the polarization state to form the polarization-controlled areas 7a and 7b and that the polarization-controlled areas 7a and 7b are periodically switched.

As shown in FIGS. 1 and 2, a lenticular lens 8 is disposed on the side of the polarization-controlled liquid crystal panel 7 facing the viewers 10 and 20. The lenticular lens 8 includes a plurality of substantially semi-cylindrical lens portions 8a extending in the F direction of FIG. 1. The lenticular lens 8 including the lens portions 8a has a function of guiding light separated by the polarization-controlled liquid crystal panel 7 into two beams with different polarization axes to the viewers 10 and 20 in two directions substantially orthogonal to the F direction. That is, the directions in which the light is guided by the lenticular lens 8 are directions toward the viewers 10 and 20 at different viewing positions in the dual-screen display mode and are directions toward the right eye 10b (20b) and the left eye (10a) of the viewer 10 (20) in the three-dimensional image display mode.

Figure 9:
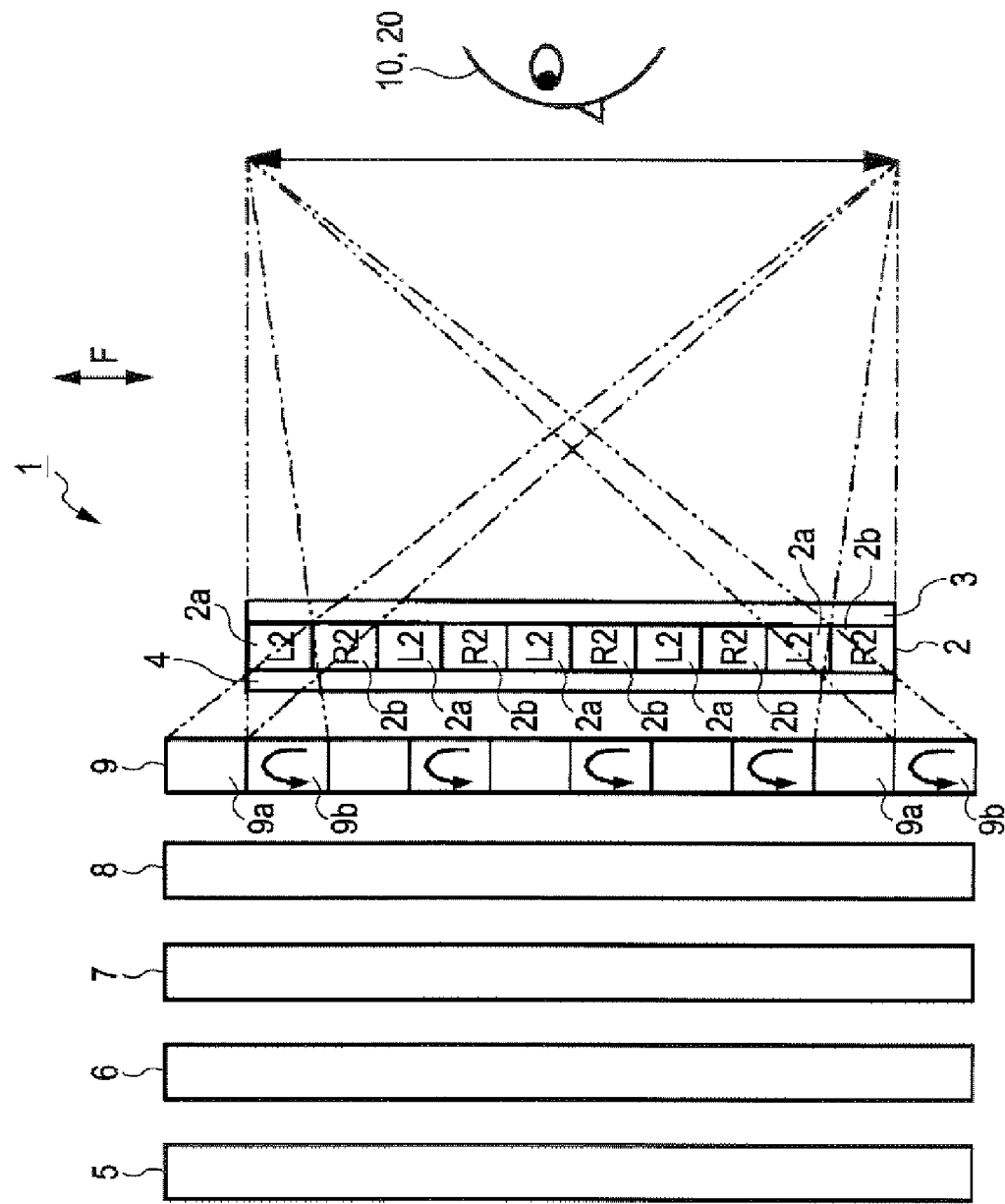
FIG. 9 is a view of the display panel viewed from the side by the viewers for describing the principle of the image display device.
Figure 10:
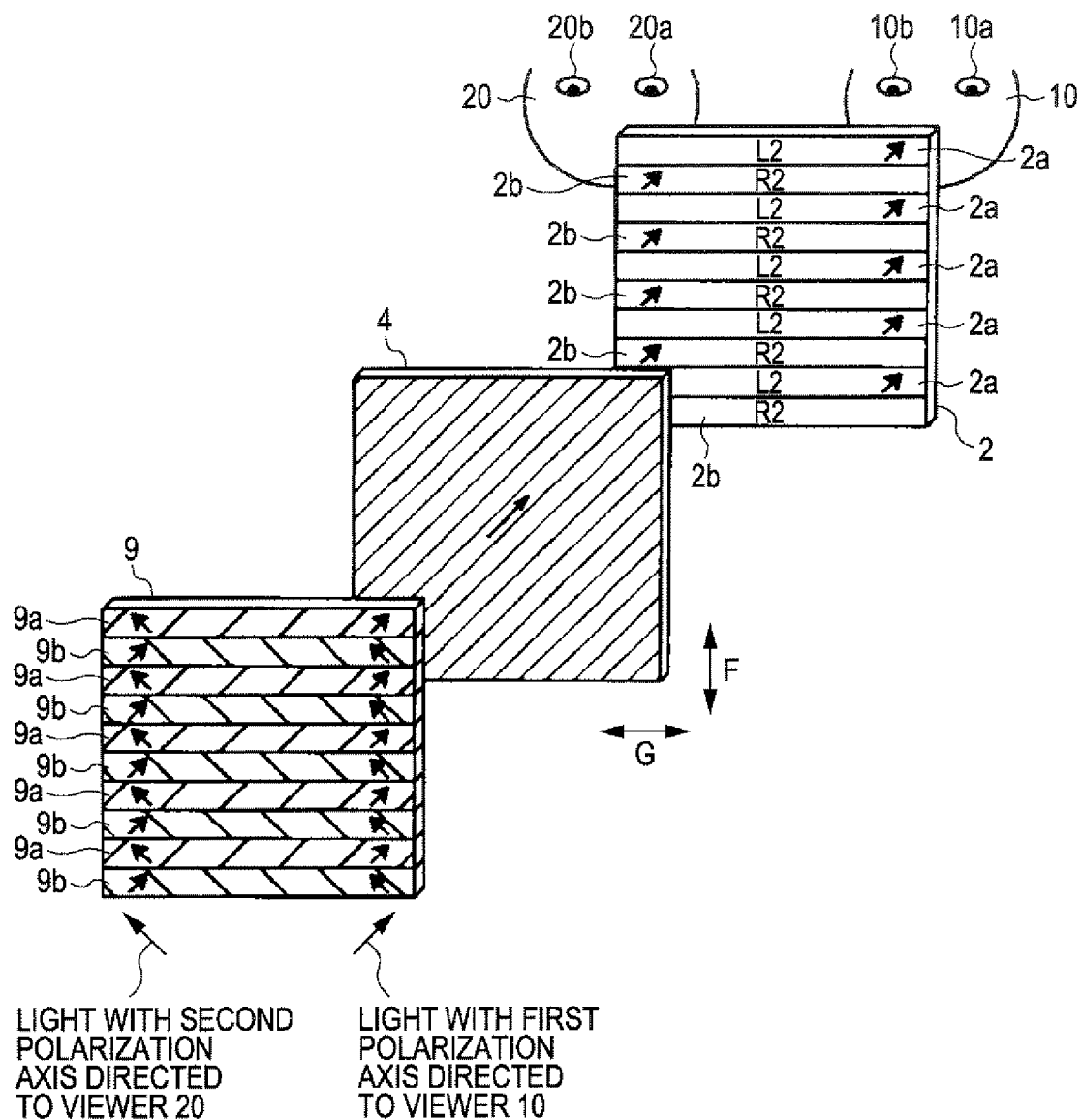
FIG. 10 is an exploded perspective view of the image display device for describing the principle of the image display device.

A retardation film 9 is disposed between the lenticular lens 8 and the polarization plate 4 attached to the display panel 2. FIG. 9 is a view of the display panel viewed from the side by the viewers for describing the principle of the image display device shown in FIG. 1. FIG. 10 is an exploded perspective view of the image display device for describing the principle of the image display device shown in FIG. 1. The retardation film 9 includes transmissive areas 9a for allowing light with the first polarization axis to pass through and polarization areas 9b for changing light with the first polarization axis to light with the second polarization axis. As shown in FIGS. 1 and 10, the transmissive areas 9a and the polarization areas 9b extend in the G direction substantially orthogonal to the F direction and are alternately disposed in the F direction. As shown in FIGS. 9 and 10, the transmissive areas 9a and the polarization areas 9b of the retardation film 9 are disposed in association with pixel rows 2a and 2b that extend in the G direction of the display panel 2 and that are alternately disposed in the F direction.

Figure 4:
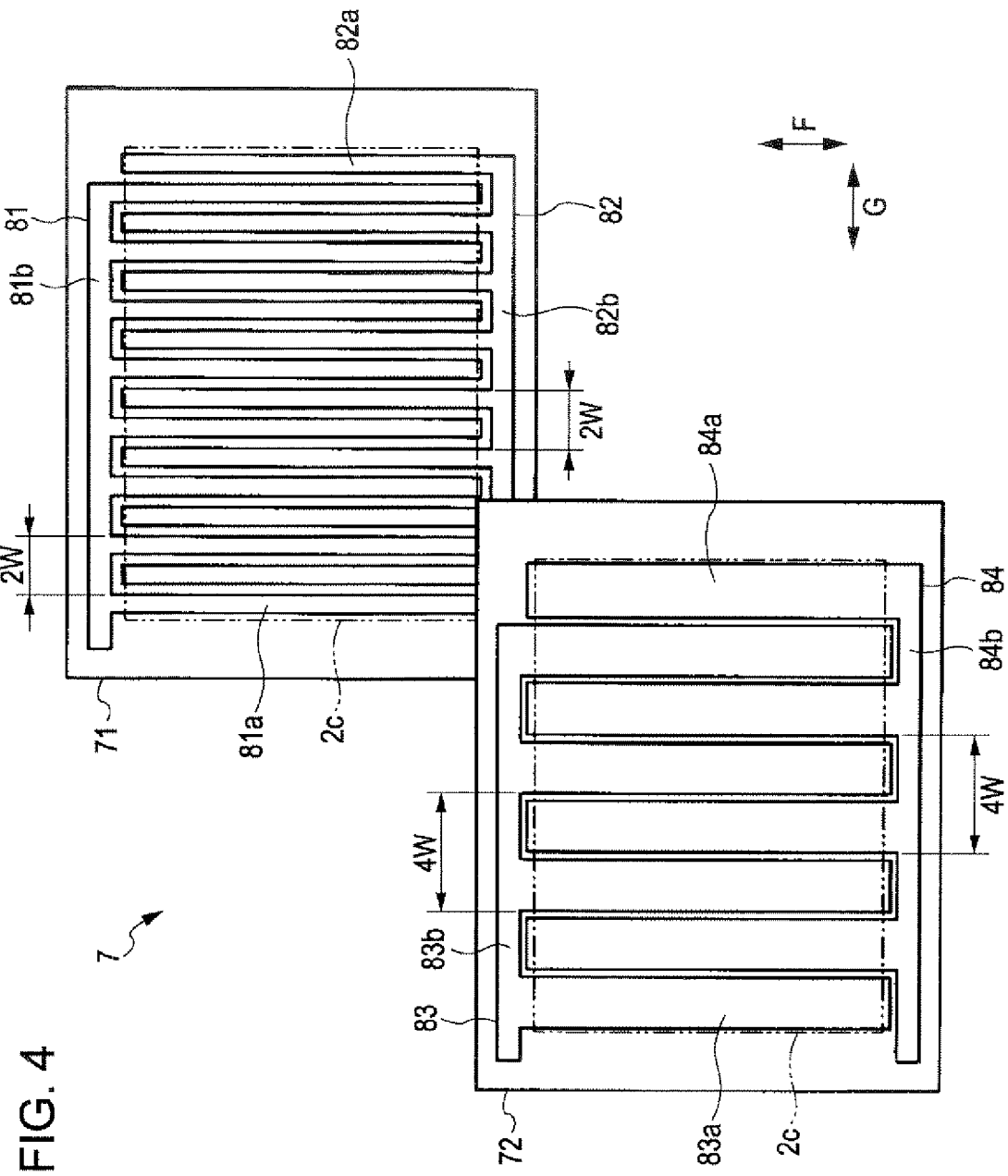
FIG. 4 is an exploded perspective view of the polarization-controlled liquid crystal panel.
Figure 5:
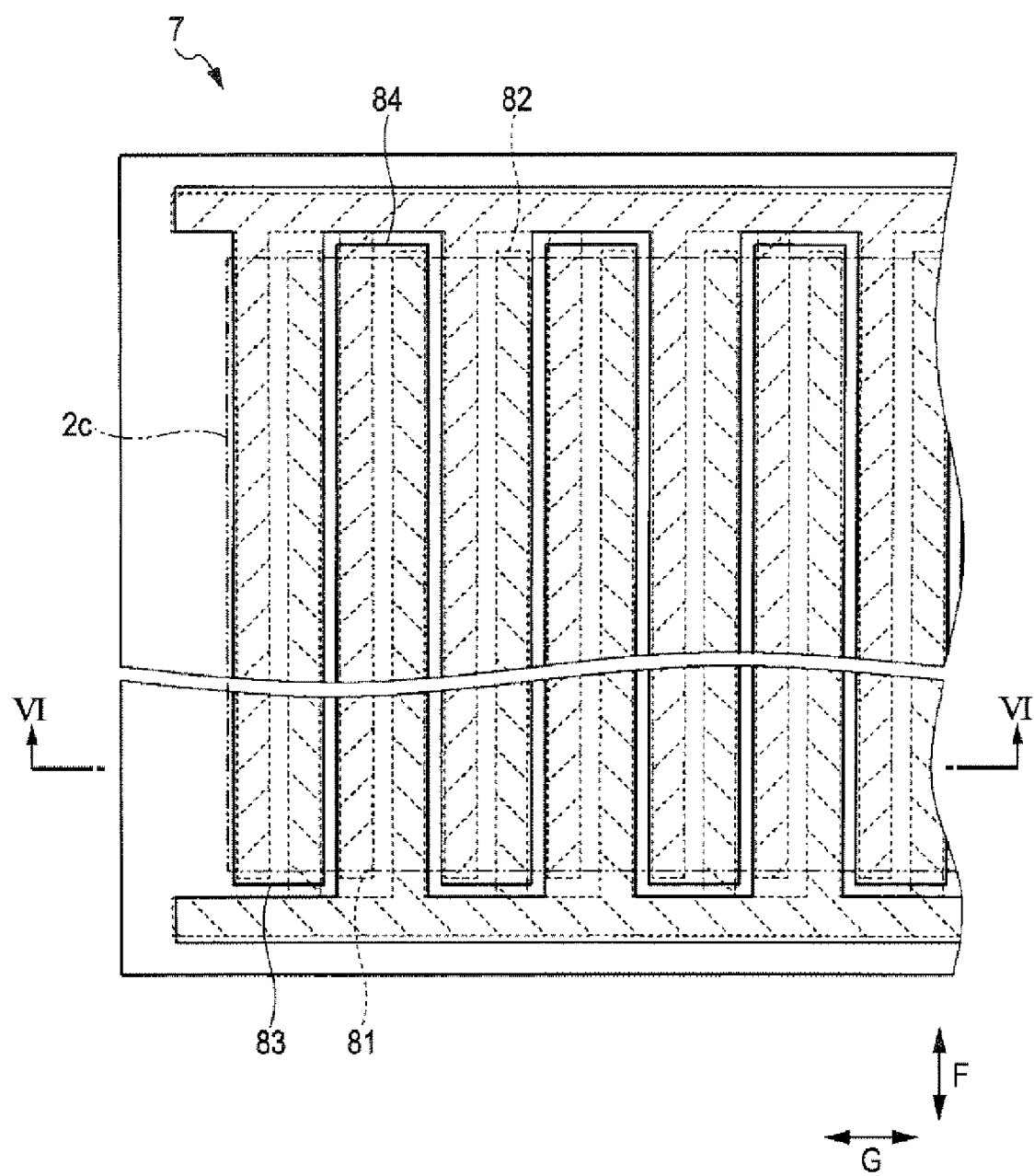
FIG. 5 is a plan view of the polarization-controlled liquid crystal panel.
Figure 6:
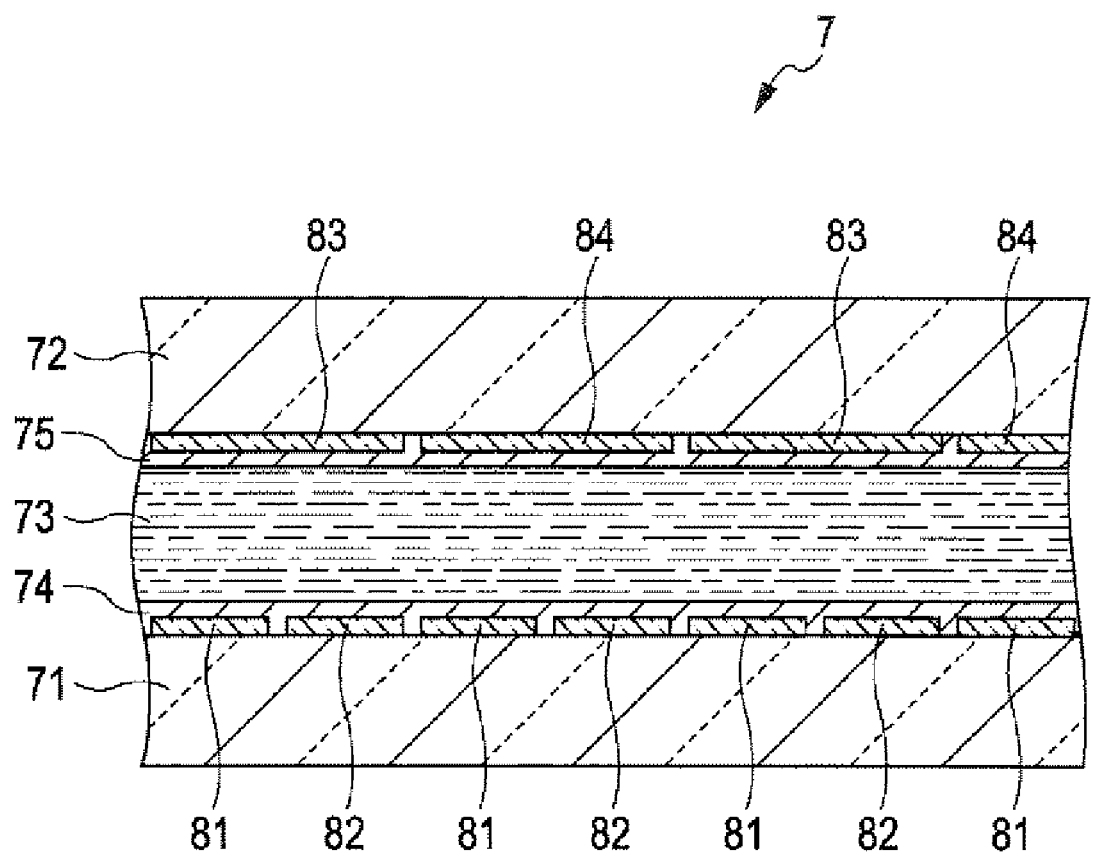
FIG. 6 is a sectional view of the polarization-controlled liquid crystal panel taken along the line VI-VI of FIG. 5.

The structure of the polarization-controlled liquid crystal panel 7 will be described in detail below. FIG. 4 is an exploded perspective view of the polarization-controlled liquid crystal panel 7. FIG. 5 is a plan view of the polarization-controlled liquid crystal panel 7. FIG. 6 is a sectional view of the polarization-controlled liquid crystal panel 7 taken along the line VI-VI of FIG. 5.

The polarization-controlled liquid crystal panel 7 includes a bottom substrate 71 and a top substrate 72, which are made of light-transmissive glass, quarts, or the like, and a liquid crystal layer 73 held between the bottom substrate 71 and the top substrate 72. The liquid crystal layer 73 includes, for example, twisted-nematic (TN) liquid crystal or the like. On the surface of the bottom substrate 71 facing the liquid crystal layer 73, bottom electrodes 81 and 82 made of transparent electrically-conductive films such as ITO, and an alignment film 74 for regulating the initial alignment of the liquid crystal layer 73 are disposed. On the surface of the top substrate 72 facing the liquid crystal layer 73, top electrodes 83 and 84 made of transparent electrically-conductive films such as ITO, and an alignment film 75 for regulating the initial alignment of the liquid crystal layer 73 are disposed.

As shown in FIG. 4, the bottom electrodes 81 and 82 are comb-like electrodes having connecting portions 81b and 82b and pluralities of strip electrodes 81a and 82a. Viewed from the F direction and a direction orthogonal to the G direction, the connecting portions 81b and 82b are disposed in areas that are outside a portion of the bottom substrate 71 corresponding to a pixel area 2c of the display panel 2 in which the pixels are disposed and that are along two sides of the bottom substrate 71 parallel to the G direction. The strip electrodes 81a and 82a extend, parallel to the F direction, from the connecting portions 81b and 82b inward of the bottom substrate 71 in a comb-like manner.

Viewed from the F direction and a direction orthogonal to the G direction, the strip electrodes 81a and 82a are formed so as to longitudinally (in the F direction) penetrate the portion of the bottom substrate 71 corresponding to the pixel area 2c of the display panel 2. Viewed from the F direction and a direction orthogonal to the G direction, the strip electrodes 81a and 82a are arranged in the width direction (G direction) at pitch 2W, which is twice the pitch W at which the unit areas 7c are arranged, throughout the portion of the bottom substrate 71 corresponding to the pixel area 2c of the display panel 2. The bottom electrodes 81 and 82 are arranged so that the strip electrodes 81a and 82a serving as the teeth of the combs interlock one another but do not overlap one another.

That is, the strip electrodes 81a and 82a extending in the F direction are alternately arranged at pitch W in the G direction in the portion of the bottom substrate 71 corresponding to the pixel area 2c of the display panel 2.

The top electrodes 83 and 84 are comb-like electrodes having connecting portions 83b and 84b and pluralities of strip electrodes 83a and 84a. Viewed from the F direction and a direction orthogonal to the G direction, the connecting portions 83b and 84b are disposed in areas that are outside a portion of the top substrate 72 corresponding to the pixel area 2c of the display panel 2 in which the pixels are disposed and that are along two sides of the top substrate 72 parallel to the G direction. The strip electrodes 83a and 84a extend, parallel to the F direction, from the connecting portions 83b and 84b inward of the top substrate 72 in a comb-like manner.

Viewed from the F direction and a direction orthogonal to the G direction, the strip electrodes 83a and 84a are formed so as to longitudinally (in the F direction) penetrate the portion of the top substrate 72 corresponding to the pixel area 2c of the display panel 2. Viewed from the F direction and a direction orthogonal to the G direction, the strip electrodes 83a and 84a are arranged in the breadthwise direction (G direction) at pitch 4W, which is four times the pitch W at which the unit areas 7c are arranged, throughout the portion of the top substrate 72 corresponding to the pixel area 2c of the display panel 2. The top electrodes 83 and 84 are arranged so that the strip electrodes 83a and 84a serving as the teeth of the combs interlock one another but do not overlap one another.

That is, the strip electrodes 83a and 84a extending in the F direction are alternately arranged at pitch 2W, which is twice the pitch W at which the strip electrodes 81a and 82a are arranged, in the portion of the top substrate 72 corresponding to the pixel area 2c of the display panel 2.

As shown in FIG. 5, when the polarization-controlled liquid crystal panel 7 is in an assembled state, viewed from the F direction and a direction orthogonal to the G direction, the top electrode 83 is formed so that the longitudinal centerline of each of the strip electrodes 83a substantially coincides with the midline between the longitudinal centerlines of the strip electrodes 81a and 82a of the bottom electrodes 81 (area hatched with upward-sloping broken lines in FIG. 5) and 82 (area hatched with downward-sloping broken lines in FIG. 5). Similarly, the longitudinal centerline of each of the strip electrodes 84a of the top electrode 84 substantially coincides with the midline between the longitudinal centerlines of the strip electrodes 81a and 82a of the bottom electrodes 81 and 82. The short-side width of each of the strip electrodes 83a and 84a of the top electrodes 83 and 84 substantially coincides with the combined widths of the strip electrodes 81a and 82a of the bottom electrodes 81 and 82. Therefore, when the polarization-controlled liquid crystal panel 7 is in its assembled state, viewed from the F direction and a direction orthogonal to the G direction, a pair of the strip electrodes 81a and 82a of the bottom electrodes 81 and 82 is superposed on each of the strip electrodes 83a and 84a of the top electrodes 83 and 84.

The unit areas 7c of the polarization-controlled liquid crystal panel 7 shown in FIG. 3 correspond to areas where the strip electrodes 81a of the bottom electrode 81 and 82 or the strip electrodes 82a of the bottom electrode 82 are superposed on the strip electrodes 83a of the top electrode 83 or the strip electrodes 84a of the top electrode 84. In other words, the alignment of the liquid crystal layer 73 is determined by potential differences in portions where the strip electrodes 81a or 82a face the strip electrodes 83a or 84a, thereby forming the polarization-controlled areas 7a and 7b of the polarization-controlled liquid crystal panel 7.

In the first embodiment, when a sufficient potential difference is applied between the bottom electrodes 81 and 82 and the top electrodes 83 and 84 in one unit area 7c, this unit area 7c becomes the polarization-controlled area 7a for allowing light with the first polarization axis to pass through. When no sufficient potential difference is generated between the bottom electrodes 81 and 82 and the top electrodes 83 and 84, this unit area 7c becomes the polarization-controlled area 7b for changing light from having the first polarization axis to having the second polarization axis substantially orthogonal to the first polarization axis.

Figure 7:
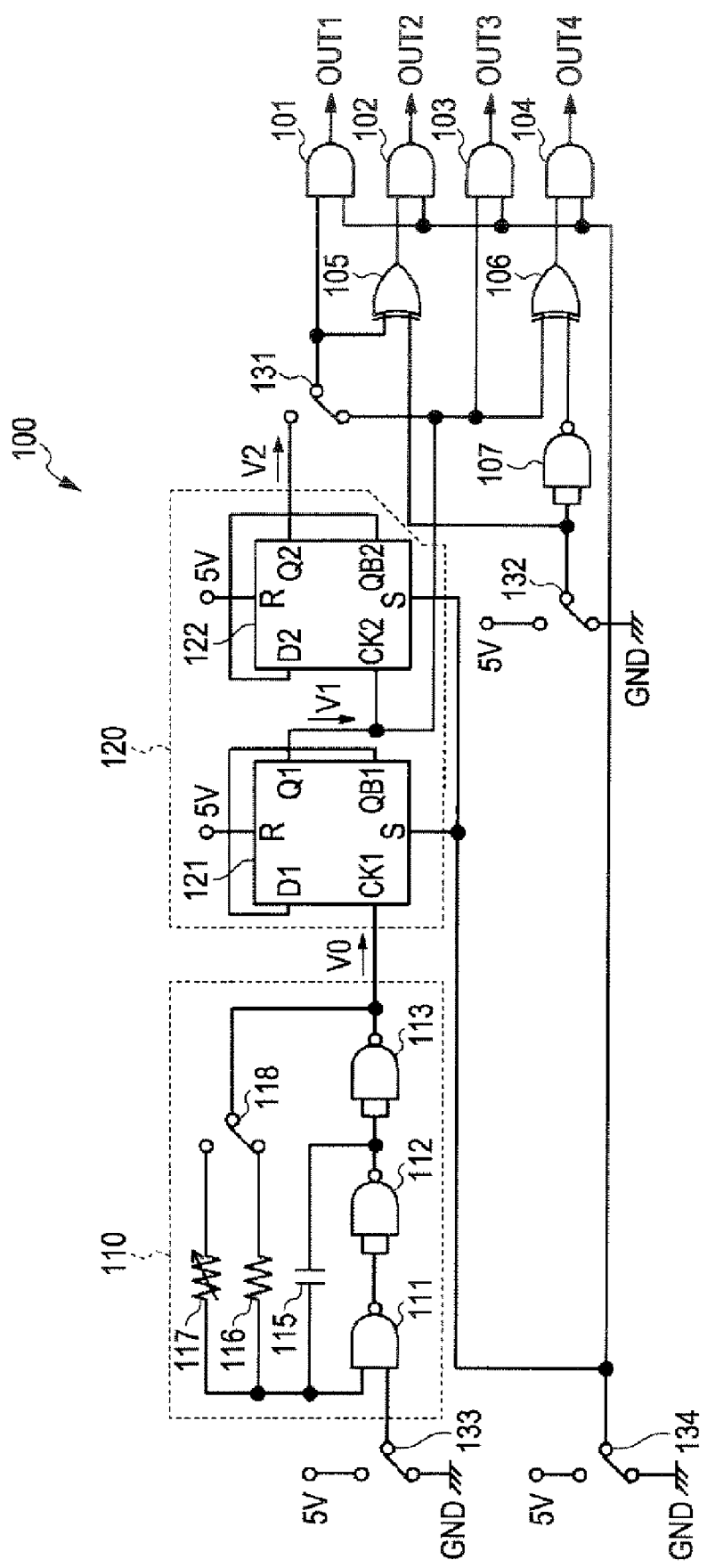
FIG. 7 is an electrical circuit diagram of a control circuit.

The potential difference between the bottom electrodes 81 and 82 and the top electrodes 83 and 84 is determined by voltages applied to electrodes facing one another. The voltages applied to the electrodes are controlled by the drive circuit 100, which will be described below. FIG. 7 is an electrical circuit diagram of the drive circuit 100.

The drive circuit 100 includes an oscillation circuit 110, a frequency dividing circuit 120, AND circuits 101 to 104, XOR circuits 105 and 106, a NAND circuit 107, and switches 131 to 134. Output ends OUT1 to OUT4 are connected to the bottom electrodes 81 and 82 and the top electrodes 83 and 84, respectively.

The switches 132, 133, and 134 each have two (first and second) input ends, which are connected to supply voltage 5V and to ground potential GND, respectively. An output end of the switch 132 is connected to two (first and second) input ends of the NAND circuit 107 and a first input end of the XOR circuit 105. An output end of the switch 133 is connected to the oscillation circuit 110. An output end of the switch 134 is connected to the frequency dividing circuit 120 and to first input ends of the circuits 101 to 104. An output end of the switch 131 is connected to a second input end of the AND circuit 101 and a second input end of the XOR circuit 105.

The switches 131 to 134 are switched so that the output ends thereof are selectively connected to one of two (first and second) input ends thereof on the basis of a switching signal from the controller 30.

The oscillation circuit 110 is a CR oscillation circuit and has NAND circuits 111 to 113, a capacitor 115, resistors 116 and 117, and a switch 118. By supplying the supply voltage 5V from the switch 133 to the NAND circuit 111, the oscillation circuit 110 outputs a clock signal V0.

The frequency of the clock signal V0 output from the oscillation circuit 110 is selected from two different frequencies determined by the resistances of the resistors 116 and 117 depending on whether the switch 118 is connected to the resistor 116 or the resistor 117. The switch 118 is switched so that the switch 118 is connected to one of the two resistors 116 and 117 on the basis of a switching signal from the controller 30.

The frequency dividing circuit 120 has two D-type flip flops (hereinafter referred to as "DFFs") 121 and 122. Of the first DFF 121, a clock input terminal CK1 is connected to the output of the oscillation circuit 110, and a non-inverted output terminal QB1 is connected to an input terminal D1. The first DFF 121 outputs, from an output terminal Q1, a clock signal V1 at a frequency half the frequency of the clock signal V0 input from the oscillation circuit 110. The first DFF 121 divides the frequency of the clock signal V0 by two to obtain the clock signal V1 having a rectangular wave with a duty ratio of 50%.

Of the second DFF 122, a clock input terminal CK2 is connected to the output terminal Q1 of the first DFF 121, and a non-inverted output terminal QB2 is connected to an input terminal D2. The second DFF 122 outputs, from an output terminal Q2, a clock signal V2 at a frequency half the frequency of the clock signal V1 input from the first DFF 121.

The output terminal Q1 of the first DFF 121 is connected to the first input end of the switch 131, a first input end of the XOR circuit 106, and a second input end of the AND circuit 103. The output terminal Q2 of the second DFF 122 is connected to the second input end of the switch 131.

An output end of the NAND circuit 107 is connected to a second input end of the XOR circuit 106. Output ends of the XOR circuits 105 and 106 are connected to second input ends of the AND circuits 102 and 104, respectively.

Output ends of the four AND circuits 101 to 104 are connected to the output ends OUT1 to OUT4, respectively. The output ends OUT1 to OUT4 are connected to the bottom electrodes 81 and 82 and the top electrodes 83 and 84, respectively. Clock signals output from the AND circuits 101 to 104 are output to the bottom electrodes 81 and 82 and the top electrodes 83 and 84, respectively.

Figure 8A:
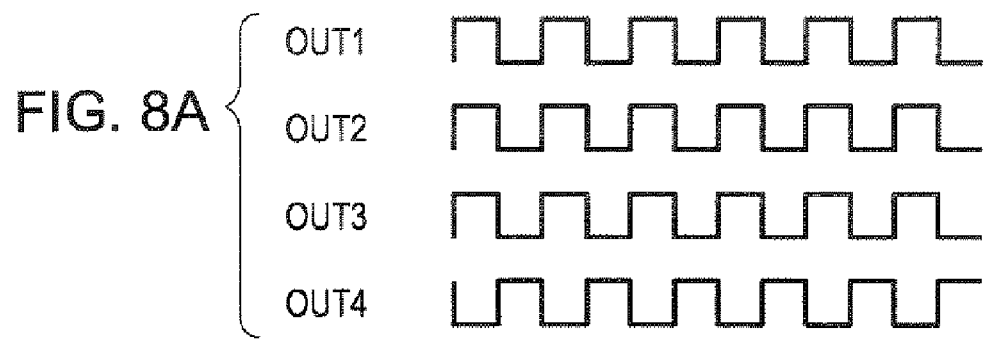
FIGS. 8A to 8C are timing charts for describing voltages output from output ends.
Figure 8B:
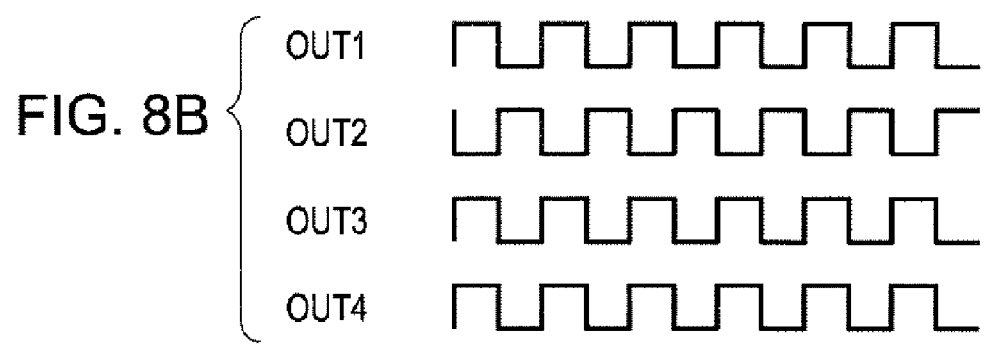
Figure 8C:
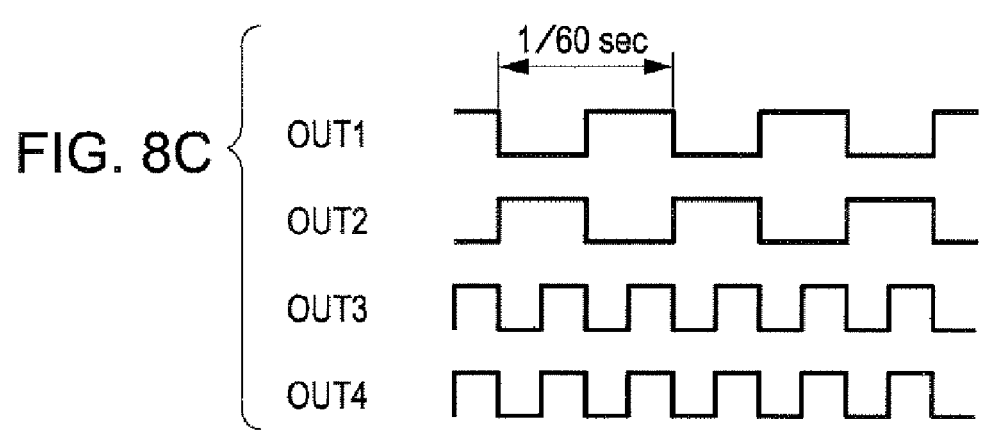

The operation of the drive circuit 100 and the waveforms of voltages output from the drive circuit 100 to the bottom electrodes 81 and 82 and the top electrodes 83 and 84 will be described. FIGS. 8A to 8C are timing charts for describing voltages output from the output ends OUT1 to OUT4.

In the dual-screen display mode, on the basis of a switching signal from the controller 30, an input end of the switch 118 is connected to the resistor 116, the input end of the switch 131 is connected to the output terminal Q1 of the first DFF 121, and the input end of the switch 132 is connected to the ground potential GND. The input ends of the switches 133 and 134 are connected to the supply voltage 5V. Therefore, as shown in FIG. 8A, the output ends OUT1, OUT2, and OUT3 output the clock signal V1 output from the output terminal Q1 of the first DFF 121, whereas the output end OUT4 outputs an inverted signal of the clock signal V1, which is inverted by the XOR circuit 106.

That is, the drive circuit 100 applies voltages to the top electrodes 83 and 84 so that the adjacent strip electrodes 83a and 84a of the top electrodes 83 and 84 have opposite phases, and the drive circuit 100 applies, to the bottom electrodes 81 and 82, a voltage having the same phase as one of the voltages applied to the top electrodes 83 and 84. Therefore, a potential difference is generated between the top electrode 84 and the bottom electrodes 81 and 82 facing the top electrode 84, and, the polarization-controlled areas 7a and 7b are alternately formed every two unit areas 7c of the polarization-controlled liquid crystal panel 7.

In the three-dimensional image display mode, on the basis of a switching signal from the controller 30, the input end of the switch 118 is connected to the resistor 116, the input end of the switch 131 is connected to the output terminal Q1 of the first DFF 121, and the input end of the switch 132 is connected to the supply voltage 5V. The input ends of the switches 133 and 134 are connected to the supply voltage 5V. Therefore, as shown in FIG. 8B, the output ends OUT1, OUT3, and OUT4 output the clock signal V1 output from the output terminal Q1 of the first DFF 121, whereas the output end OUT2 outputs an inverted signal of the clock signal V1, which is inverted by the XOR circuit 105.

That is, the drive circuit 100 applies voltages to the bottom electrodes 81 and 82 so that the adjacent strip electrodes 81a and 82a of the bottom electrodes 81 and 82 have opposite phases, and the drive circuit 100 applies, to the top electrodes 83 and 84, a voltage having the same phase as one of the voltages applied to the bottom electrodes 81 and 82. Therefore, a potential difference is generated between the bottom electrode 82 and the top electrodes 83 and 84 facing the bottom electrode 82, and, the polarization-controlled areas 7a and 7b are alternately formed every unit area 7c of the polarization-controlled liquid crystal panel 7.

In the two-dimensional image display mode, on the basis of a switching signal from the controller 30, the input end of the switch 118 is connected to the resistor 117, the input end of the switch 131 is connected to the output terminal Q2 of the second DFF 122, and the input end of the switch 132 is connected to the supply voltage 5V. The input ends of the switches 133 and 134 are connected to the supply voltage 5V. Therefore, as shown in FIG. 8C, the output ends OUT3 and OUT4 output the clock signal V1 output from the output terminal Q1 of the first DFF 121. The output end OUT1 outputs the clock signal V2 output from the output terminal Q2 of the second DFF 122. The output end OUT2 outputs an inverted signal of the clock signal V2, which is inverted by the XOR circuit 105.

That is, the drive circuit 100 applies voltages to the bottom electrodes 81 and 82 so that the adjacent strip electrodes 81a and 82a of the bottom electrodes 81 and 82 have opposite phases, and the drive circuit 100 applies, to the top electrodes 83 and 84, voltages having a period half that of the voltages applied to the bottom electrodes 81 and 82. Therefore, a potential difference is alternately and periodically generated between the bottom electrode 81 and the top electrodes 83 and 84 and between the bottom electrode 82 and the top electrodes 83 and 84. Thus, the polarization-controlled areas 7a and 7b are alternately formed every unit area 7c of the polarization-controlled liquid crystal panel 7, and the polarization-controlled areas 7a and 7b are periodically and alternately switched. The period during which the polarization-controlled areas 7a and 7b are switched is four times the period of the clock signal V0 determined by the resistor 117 of the oscillation circuit 110 and is 1/60 seconds in the first embodiment.

Next, the operation of the image display device 1 of the first embodiment will be described in detail.

Dual-Screen Display Mode

Figure 11:
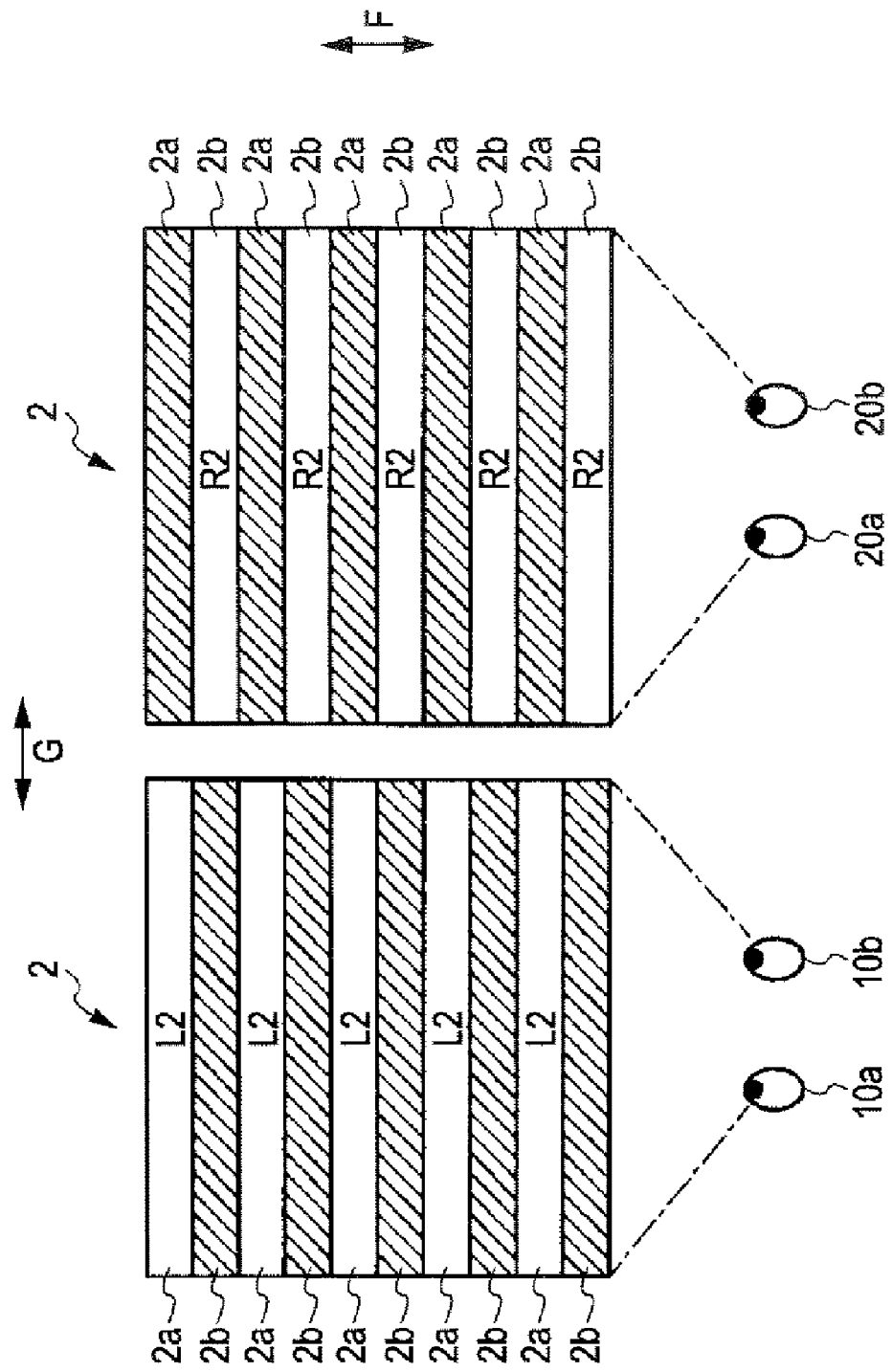
FIG. 11 is a diagram for describing areas of the display panel viewed by the viewers in a dual-screen display mode of the image display device.

With reference to FIGS. 2 and 9 to 11, the operation of the image display device 1 of the first embodiment in the dual-screen display mode will be described. FIG. 11 is a diagram for describing areas of the display panel viewed by the viewers in the dual-screen display mode of the image display device of the first embodiment shown in FIG. 1.

Image data including information about two different images is input from an external device to the controller 30. At the same time, the external device gives an image display mode switching command to the controller 30. By supplying image signals from the controller 30 to the display panel 2, images are displayed on the display panel 2. The image signals supplied from the controller 30 are two image signals for an image L2 (e.g., a television image) and an image R2 (e.g., a car navigation image). In the first embodiment, as shown in FIG. 10, in the dual-screen display mode, the image L2 is displayed in the pixel rows 2a of the display panel 2, and the image R2 is displayed in the pixel rows 2b of the display panel 2.

With reference to FIGS. 2 and 10, the structure of the polarization-controlled liquid crystal panel 7 and the display panel 2 for providing different images to the viewers 10 and 20 at different viewing positions will be described. In the image display device 1 in the dual-screen display mode, as shown in FIG. 2, a pair of the polarization-controlled areas 7a and 7b of the polarization-controlled liquid crystal panel 7 is provided for each of the lens portions 8a of the lenticular lens 8. That is, in the dual-screen display mode, as has been described above, the polarization-controlled areas 7a and 7b of the polarization-controlled liquid crystal panel 7 each include two unit areas 7c (see FIG. 3).

With this structure, light emitted from the backlight 5 is routed to the polarization plate 6, which is disposed on the side of the backlight 5 facing the viewers 10 and 20, and only light with the first polarization axis is allowed to pass through the polarization plate 6 toward the polarization-controlled liquid crystal panel 7. The light with the first polarization axis passes through the polarization-controlled areas 7a and 7b of the polarization-controlled liquid crystal panel 7. In this case, the light entering the polarization-controlled areas 7a of the polarization-controlled liquid crystal panel 7 is allowed to pass through the polarization-controlled areas 7a without changing the polarization axis. In contrast, the polarization axis of the light entering the polarization-controlled areas 7b of the polarization-controlled liquid crystal panel 7 is changed substantially by 90 degrees, and the light with the second polarization axis exits from the polarization-controlled areas 7b. Thereafter, as shown in FIG. 2, the light with the first polarization axis, which comes from the polarization-controlled areas 7a, is collected by the lenticular lens 8 so that the light is directed to the viewer 10. The light with the second polarization axis substantially orthogonal to the first polarization axis, which comes from the polarization-controlled areas 7b, is collected by the lenticular lens 8 so that the light is directed to the viewer 20.

As shown in FIG. 10, the light with the first polarization axis, which is directed to the viewer 10, enters the retardation film 9 having the transmissive areas 9a and the polarization areas 9b. The light with the first polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the second polarization axis exits from the polarization areas 9b. Thereafter, the light with the first polarization axis, which comes from the transmissive areas 9a of the retardation film 9 and which is directed to the viewer 10, enters the polarization plate 4 disposed between the display panel 2 and the retardation film 9, passes through the polarization plate 4, and enters the pixel rows 2a of the display panel 2. In contrast, the light with the second polarization axis substantially orthogonal to the first polarization axis, which comes from the polarization areas 9b of the retardation film 9 and which is directed to the viewer 10, enters the polarization plate 4 disposed between the display panel 2 and the retardation film 9 and is absorbed by the polarization plate 4. Thus, no light passing through the pixel rows 2b of the display panel 2 displaying the image R2 reaches the viewer 10, and the viewer 10 cannot see the image R2 displayed in the pixel rows 2b of the display panel 2. Accordingly, the viewer 10 can see only the image L2 displayed in the pixel rows 2a of the display panel 2, as shown in FIG. 11.

Figure 12:
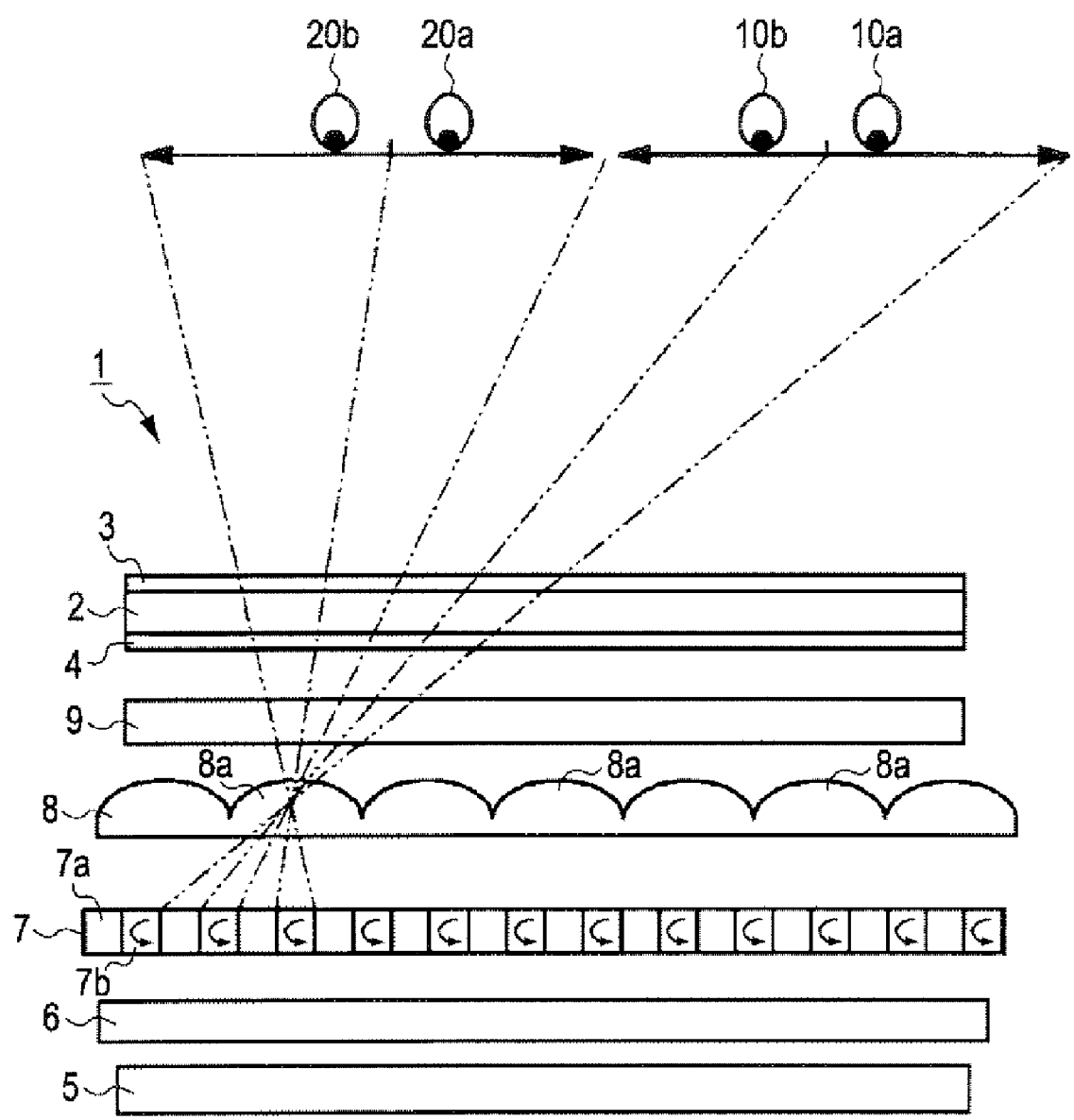
FIG. 12 is a view of the display panel viewed from the top by the viewers for describing the principle of displaying a three-dimensional image by the image display device.
Figure 13:
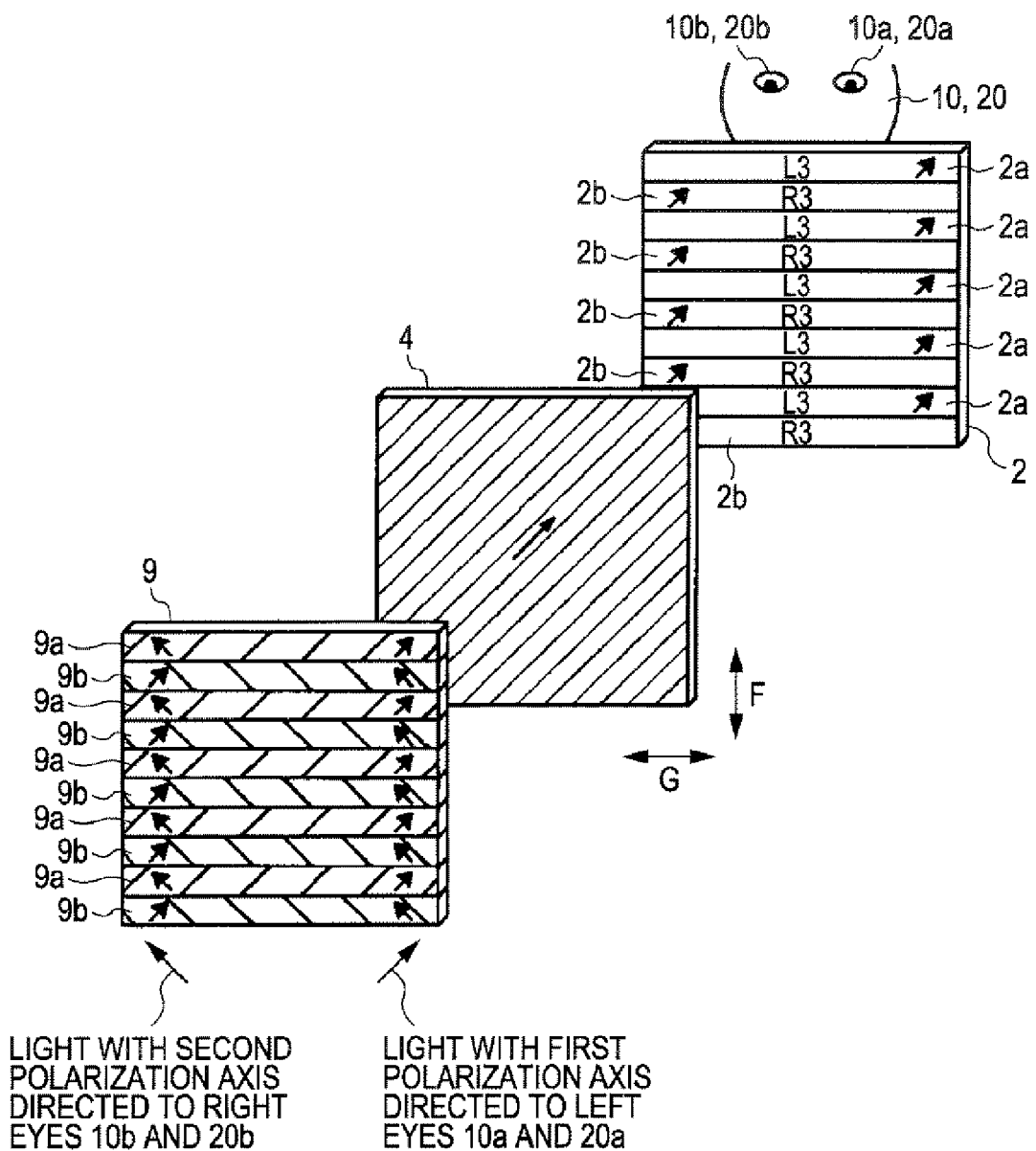
FIG. 13 is an exploded perspective view of the image display device for describing the principle of displaying a three-dimensional image by the image display device.
Figure 14:
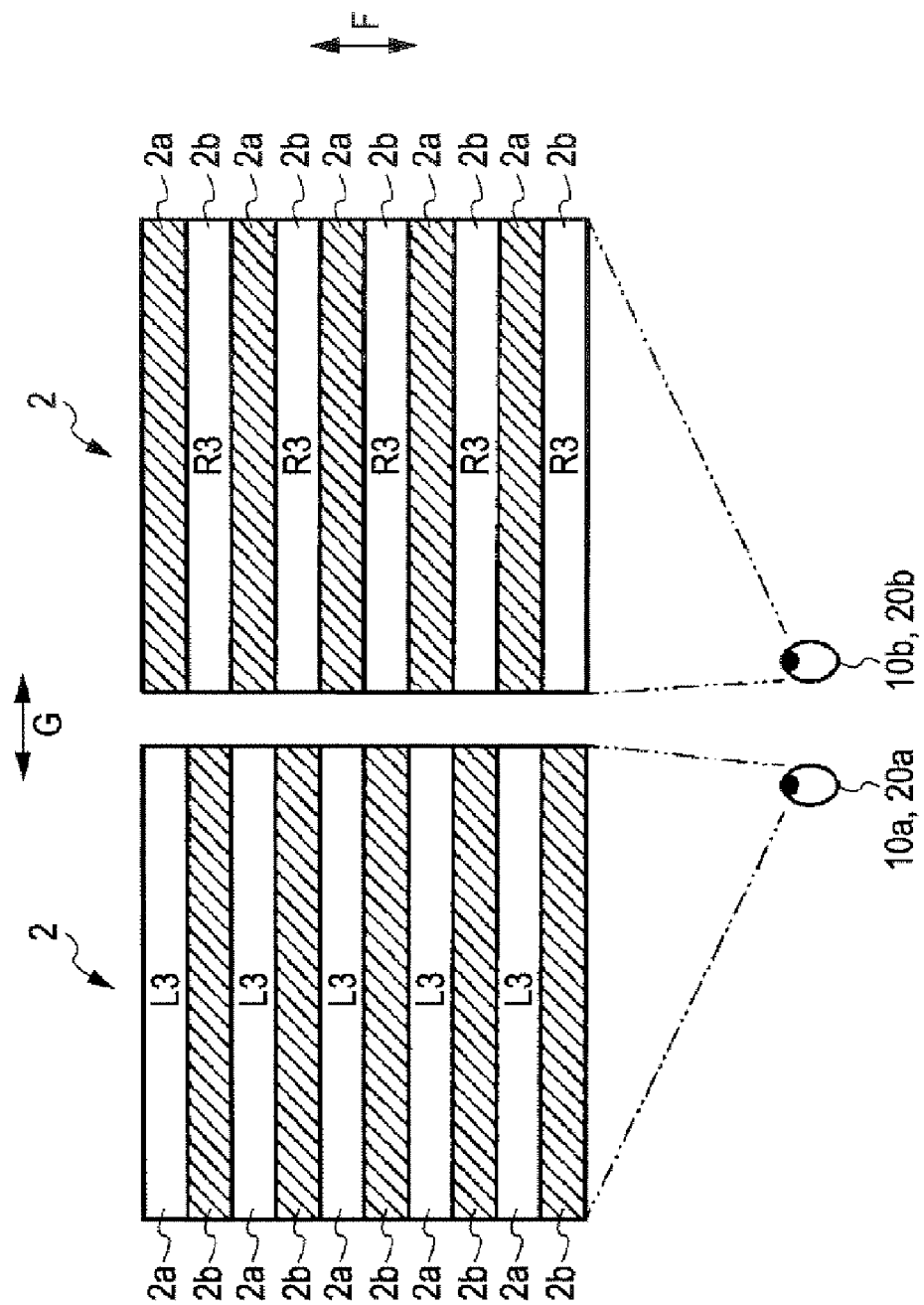
FIG. 14 is a diagram for describing areas of the display panel viewed by the viewers in a three-dimensional image display mode of the image display device.

As shown in FIG. 10, the light with the second polarization axis, which is directed to the viewer 20, enters the retardation film 9 having the transmissive areas 9a and the polarization areas 9b. The light with the second polarization axis substantially orthogonal to the first polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the first polarization axis exits from the polarization areas 9b. Thereafter, the light with the second polarization axis substantially orthogonal to the first polarization axis, which comes from the transmissive areas 9a of the retardation film 9 and which is directed to the viewer 20, enters the polarization plate 4 disposed between the display panel 2 and the retardation film 9 and is absorbed by the polarization plate 4. Thus, no light passing through the pixel rows 2a of the display panel 2 displaying the image L2 reaches the viewer 20, and the viewer 20 cannot see the image L2 displayed in the pixel rows 2a of the display panel 2. In contrast, the light with the first polarization axis, which comes from the polarization areas 9b of the retardation film 9 and which is directed to the viewer 20, enters the polarization plate 4 disposed between the display panel 2 and the retardation film 9, passes through the polarization plate 4, and enters the pixel rows 2b of the display panel 2. Accordingly, the viewer 20 can see only the image R2 displayed in the pixel rows 2b of the display panel 2, as shown in FIG. 11, Three-Dimensional Image Display Mode Next, the operation of the image display device 1 of the first embodiment in the three-dimensional image display mode will be described with reference to FIGS. 12 to 14. FIG. 12 is a view of the display panel viewed from the top by the viewers for describing the principle. Of displaying a three-dimensional image by the image display device of the first embodiment shown in FIG. 1. FIG. 13 is an exploded perspective view of the image display device for describing the principle of displaying a three-dimensional image by the image display device. FIG. 14 is a diagram for describing areas of the display panel viewed by the viewers in the three-dimensional image display mode of the image display device.

Image data including information about two different images is input from an external device to the controller 30. At the same time, the external device gives an image display mode switching command to the controller 30. By supplying image signals from the controller 30 to the display panel 2, images are displayed on the display panel 2. The image signals supplied from the controller 30 are two image signals for a left-eye image L3 entering the left eyes 10a and 20a of the viewers 10 and 20 and a right-eye image R3 entering the right eyes 10b and 20b of the viewers 10 and 20. In the first embodiment, as shown in FIG. 13, in the three-dimensional image display mode, the left-eye image L3 is displayed in the pixel rows 2a of the display panel 2, and the right-eye image R3 is displayed in the pixel rows 2b of the display panel 2.

The structure of the polarization-controlled liquid crystal panel 7 and the display panel 2 for providing a three-dimensional image to the viewers 10 and 20 at different viewing positions will be described. As shown in FIG. 12, two pairs of the polarization-controlled areas 7a and 7b of the polarization-controlled liquid crystal panel 7 are provided for each of the lens portions 8a of the lenticular lens 8. That is, in the three-dimensional image display mode, as has been described above, the polarization-controlled areas 7a and 7b of the polarization-controlled liquid crystal panel 7 each include one unit area 7c (see FIG. 3).

With this structure, light emitted from the backlight 5 is routed to the polarization plate 6, which is disposed on the side of the backlight 5 facing the viewers 10 and 20, and only light with the first polarization axis is allowed to pass through the polarization plate 6 toward the polarization-controlled liquid crystal panel 7. The light with the first polarization axis passes through the polarization-controlled areas 7a and 7b of the polarization-controlled liquid crystal panel 7. In this case, the light entering the polarization-controlled areas 7a of the polarization-controlled liquid crystal panel 7 is allowed to pass through the polarization-controlled areas 7a without changing the polarization axis. In contrast, the polarization axis of the light entering the polarization-controlled areas 7b of the polarization-controlled liquid crystal panel 7 is changed substantially by 90 degrees, and the light with the second polarization axis exits from the polarization-controlled areas 7b. Thereafter, the light with the first polarization axis, which comes from the polarization-controlled areas 7a, is collected by the lenticular lens 8 so that the light is directed to the left eyes 10a and 20a of the viewers 10 and 20. The light with the second polarization axis substantially orthogonal to the first polarization axis, which comes from the polarization-controlled areas 7b, is collected by the lenticular lens 8 so that the light is directed to the right eyes 10b and 20b of the viewers 10 and 20.

As shown in FIG. 13, the light with the first polarization axis, which is directed to the left eyes 10a and 20a of the viewers 10 and 20, enters the retardation film 9 having the transmissive areas 9a and the polarization areas 9b. The light with the first polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the second polarization axis exits from the polarization areas 9b. Thereafter, the light with the first polarization axis, which comes from the transmissive areas 9a of the retardation film 9 and which is directed to the left eyes 10a and 20a of the viewers 10 and 20, enters the polarization plate 4 disposed between the display panel 2 and the retardation film 9, passes through the polarization plate 4, and enters the pixel rows 2a of the display panel 2. In contrast, the light with the second polarization axis substantially orthogonal to the first polarization axis, which comes from the polarization areas 9b of the retardation film 9 and which is directed to the left eyes 10a and 20a of the viewers 10 and 20, enters the polarization plate 4 disposed between the display panel 2 and the retardation film 9 and is absorbed by the polarization plate 4. Thus, no light passing through the pixel rows 2b of the display panel 2 displaying the right-eye image R3 reaches the left eyes 10a and 20a of the viewers 10 and 20, and the left eyes 10a and 20a of the viewers 10 and 20 cannot see the right-eye image R3 displayed in the pixel rows 2b of the display panel 2. Accordingly, only the left-eye image L3 displayed in the pixel rows 2a of the display panel 2 enters the left eyes 10a and 20a of the viewers 10 and 20, as shown in FIG. 14.

As shown in FIG. 13, the light with the second polarization axis, which is directed to the right eyes 10b and 20b of the viewers 10 and 20, enters the retardation film 9 having the transmissive areas 9a and the polarization areas 9b. The light with the second polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the first polarization axis exits from the polarization areas 9b. Thereafter, the light with the second polarization axis, which comes from the transmissive areas 9a of the retardation film 9 and which is directed to the right eyes 10b and 20b of the viewers 10 and 20, enters the polarization plate 4 disposed between the display panel 2 and the retardation film 9 and is absorbed by the polarization plate 4. Thus, no light passing through the pixel rows 2a of the display panel 2 displaying the left-eye image L3 reaches the right eyes 10b and 20b of the viewers 10 and 20, and the right eyes 10b and 20b of the viewers 10 and 20 cannot see the left-eye image L3 displayed in the pixel rows 2a of the display panel 2. In contrast, the light with the first polarization axis, which comes from the polarization areas 9b of the retardation film 9 and which is directed to the right eyes 10b and 20b of the viewers 10 and 20, enters the polarization plate 4 disposed between the display panel 2 and the retardation film 9, passes through the polarization plate 4, and enters the pixel rows 2b of the display panel 2. Accordingly, the right-eye image R3 displayed in the pixel rows 2b of the display panel 2 enters the right eyes 10b and 20b of the viewers 10 and 20, as shown in FIG. 14. As has been described above, the left-eye image L3 and the right-eye image R3 having binocular parallax enter the left and right eyes of the viewers 10 and 20, respectively, and hence, the viewers 10 and 20 can see a three-dimensional image.

Two-Dimensional Image Display Mode with Less Image Deterioration

Figure 15:
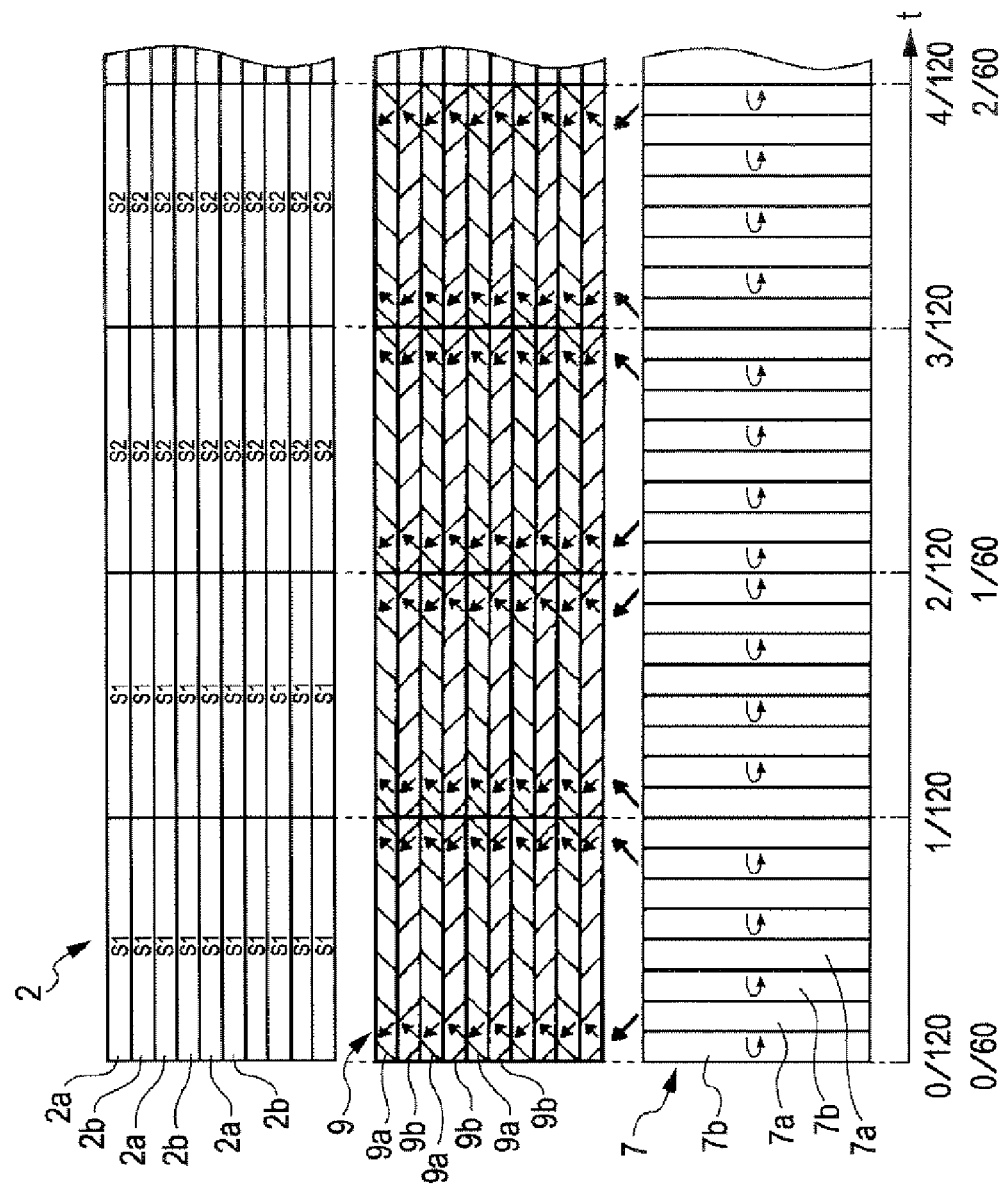
FIG. 15 is a diagram showing the polarization-controlled liquid crystal panel, a retardation film, and the display panel in a two-dimensional image display mode of the image display device.
Figure 16:
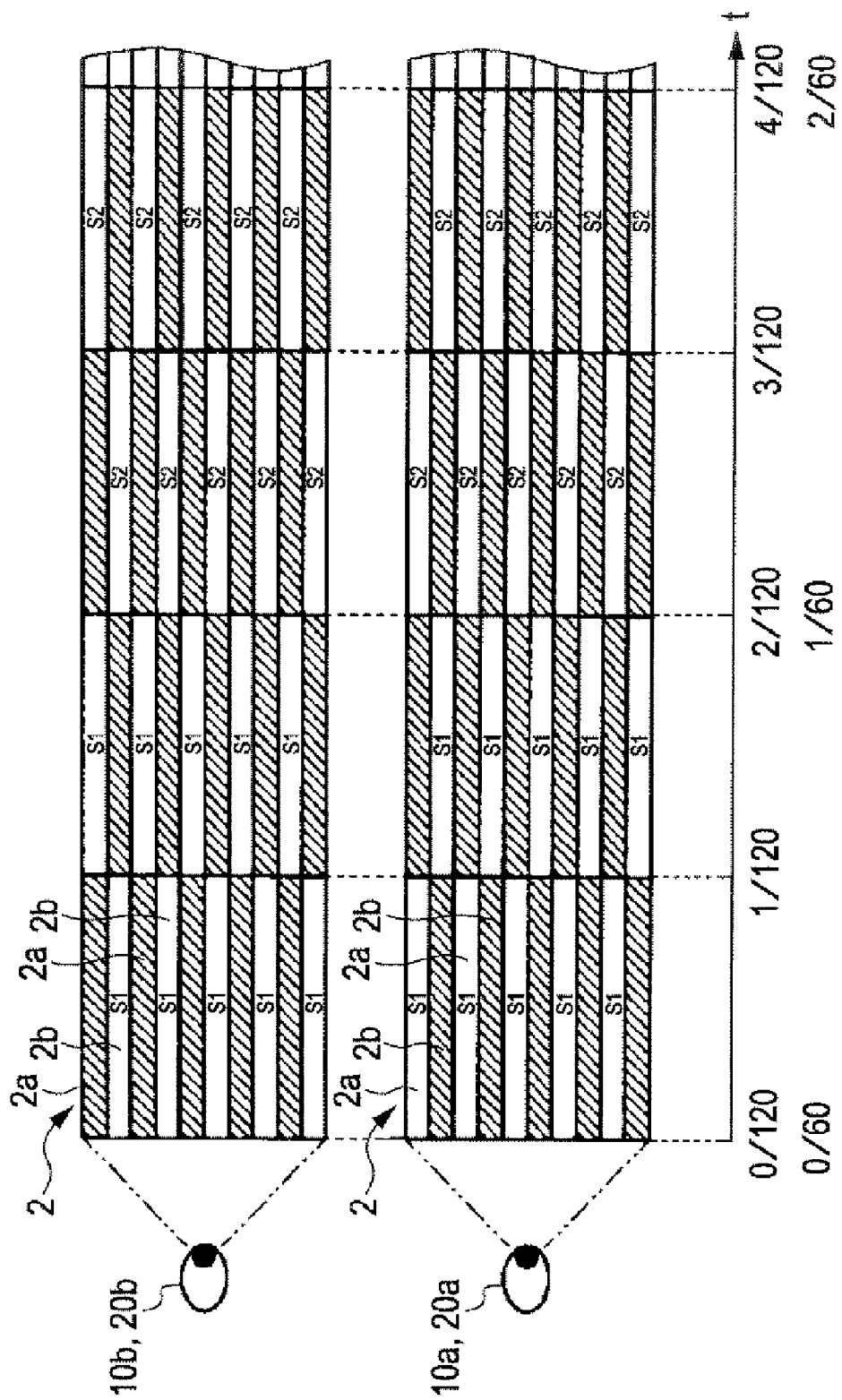
FIG. 16 is a diagram for describing areas of the display panel viewed by the viewers in the two-dimensional image display mode of the image display device.

Next, the operation of the image display device 1 of the first embodiment in the two-dimensional image display mode will be described with reference to FIGS. 12, 15, and 16. FIG. 15 is a diagram showing the polarization-controlled liquid crystal panel, the retardation film, and the display panel in the two-dimensional image display mode of the image display device. FIG. 16 is a diagram describing areas of the display panel viewed by the viewers in the two-dimensional image display mode of the image display device.

Image data is input from an external device to the controller 30. At the same time, the external device gives an image display mode switching command to the controller 30. As shown in FIG. 15, in the two-dimensional image display mode, a two-dimensional image S1 is displayed on the display panel 2 from 0/120 seconds to 2/120 seconds, and a two-dimensional image S2 is displayed from 2/120 seconds to 4/120 seconds. The two-dimensional images S1 and S2 are sequentially and alternately displayed every 1/60 seconds.

The structure of the polarization-controlled liquid crystal panel 7 and the display panel 2 for providing a two-dimensional image to the viewers 10 and 20 at different viewing positions will be described. Two pairs of the polarization-controlled areas 7a and 7b of the polarization-controlled liquid crystal panel 7 are provided for each of the lens portions 8a of the lenticular lens 8, as in the three-dimensional image display mode shown in FIG. 12. That is, in the two-dimensional image display mode with less image deterioration, the polarization-controlled areas 7a and 7b of the polarization-controlled liquid crystal panel 7 each include one unit area 7c (see FIG. 3).

In the two-dimensional image display mode, the polarization-controlled liquid crystal panel 7 is controlled so that the polarization-controlled areas 7a and 7b of the polarization-controlled liquid crystal panel 7 are switched every 1/2 frame period of the display panel 2 (every 1/120 seconds) with the above-described structure, as shown in FIGS. 15 and 16, from 0/120 seconds to 1/120 seconds, the two-dimensional image S1 displayed in the pixel rows 2a of the display panel 2 enters the left eyes 10a and 20a of the viewers 10 and 20, and the two-dimensional image S1 displayed in the pixel rows 2b of the display panel 2 enters the right eyes 10b and 20b of the viewers 10 and 20. From 1/120 seconds to 2/120 seconds, the polarization-controlled areas 7a and 7b of the polarization-controlled liquid crystal panel 7 are controlled so that the polarization-controlled areas 7a and 7b are switched. Thus, light directed to the left eyes 10a and 20a of the viewers 10 and 20 passes through the polarization-controlled areas 7b of the polarization-controlled liquid crystal panel 7, the polarization axis of which is changed substantially by 90 degrees, and the light with the changed polarization axis is routed toward the retardation film 9. Therefore, as shown in FIG. 16, from 1/120 seconds to 2/120 seconds, the two-dimensional image S1 displayed in the pixel rows 2b of the display panel 2 enters the left eyes 10a and 20a of the viewers 10 and 20, and the two-dimensional image S1 displayed in the pixel rows 2a of the display panel 2 enters the right eyes 10b and 20b of the viewers 10 and 20.

From 2/120 seconds to 3/120 seconds, as in the interval from 0/120 seconds to 1/120 seconds, the two-dimensional image S2 displayed in the pixel rows 2a of the display panel 2 enters the left eyes 10a and 20a of the viewers 10 and 20, and the two-dimensional image S2 displayed in the pixel rows 2b of the display panel 2 enters the right eyes 10b and 20b of the viewers 10 and 20. From 3/120 seconds to 4/120 seconds, as in the interval from 1/120 seconds to 2/120 seconds, the two-dimensional image S2 displayed in the pixel rows 2b of the display panel 2 enters the left eyes 10a and 20a of the viewers 10 and 20, and the two-dimensional image S2 displayed in the pixel rows 2a of the display panel 2 enters the right eyes 10b and 20b of the viewers 10 and 20. In this manner, a two-dimensional image S displayed in the entire display panel 2 enters the left and right eyes of the viewers 10 and 20 within 2/120 seconds (1/60 seconds). Accordingly, a two-dimensional image with less deterioration can be provided to the viewers 10 and 20.

The image display device of the first embodiment described above has the following advantages.

Between the backlight 5 and the display panel 2, the polarization-controlled liquid crystal panel 7 is disposed to separate light emitted from the backlight 5 through the polarization plate 6 into a light beam with the first polarization axis and a light beam with the second polarization axis substantially orthogonal to the first polarization axis. Between the polarization-controlled liquid crystal panel 7 and the display panel 2, the lenticular lens 8 is provided to route the light beams with different polarization axes, which are separated by the polarization-controlled liquid crystal panel 71 in predetermined directions. Accordingly, the light emitted from the backlight 5 can be separated, before entering the display panel 2, into light beams directed to the viewers 10 and 20 at different viewing positions. Even when a high-resolution display panel 2 with a small pixel pitch is used, the light is directed to the viewers 10 and 20 regardless of the pixel pitch of the display panel 2. Therefore, a high-resolution image can be provided to the viewers 10 and 20 at different viewing positions.

Because the lenticular lens 8 is provided to direct the light beams with different polarization axes, which are separated by the polarization-controlled liquid crystal panel 7, in predetermined associated directions, the light beams directed to the viewers 10 and 20 are not blocked, unlike the case where the light coming from the display panel 2 is directed to pass through a member that restricts the light to be routed in directions with predetermined angles. Therefore, the luminance of light directed to the viewers 10 and 20 is prevented from decreasing, and hence an image is prevented from being displayed as a dark image.

The polarization-controlled liquid crystal panel 7 is provided with the polarization-controlled areas 7a for allowing light with the first polarization axis to pass through, and the polarization-controlled areas 7b for changing light from having the first polarization axis to having the second polarization axis substantially orthogonal to the first polarization axis. The lenticular lens 8 is provided with the substantially semi-cylindrical lens portions 8a each of which is associated with a pair of the polarization-controlled areas 7a and 7b. Hence, light with the first polarization axis and light with the second polarization axis substantially orthogonal to the first polarization axis are separately directed by the lens portions 8a of the lenticular lens 8 to the viewers 10 and 20 at different viewing positions. Therefore, different images can be easily provided to the viewers 10 and 20 at different viewing positions.

Since the display panel 2 is provided with the pixel rows 2a and 2b in association with the transmissive areas 9a and the polarization areas 9b of the retardation film 91 which extend in the G direction of FIG. 1, light passing through the transmissive areas 9a of the retardation film 9 can be directed to enter the pixel rows 2a of the display panel 2 and to be routed to the viewer 10 while maintaining the image L2 being displayed in the pixel rows 2a of the display panel 2 (see FIG. 9). Also, light passing through the polarization areas 9b can be directed to enter the pixel rows 2b of the display panel 2 and to be routed to the viewer 20 while maintaining the image R2 being displayed in the pixel rows 2a of the display panel 2 (see FIG. 9). Accordingly, different images can be provided to the viewers 10 and 20 at different viewing positions.

By controlling the voltages applied to the bottom electrodes 81 and 82 and the top electrodes 83 and 84 of the polarization-controlled liquid crystal panel 7, the polarization-controlled areas 7a for allowing light with the first polarization axis to pass through and the polarization-controlled areas 7b for changing light from having the first polarization axis to having the second polarization axis substantially orthogonal to the first polarization axis can be easily formed on the polarization-controlled liquid crystal panel 7. Therefore, the polarization axis of light emitted from the backlight 5 can be easily controlled. Accordingly, light emitted from the backlight 5 is directed through the segmented polarization-controlled areas 7a and 7b to enter the lens portions 8a of the lenticular lens 8, thereby breaking a light-reaching area into segments. Since the light-reaching area can be broken into segments corresponding to the right eye 10b (20b) and the left eye 10a (20a) of the viewer 10 (20), images having binocular parallax can be directed to enter the left eye 10a (20a) and the right eye 10b (20b) of the viewer 10 (20). Accordingly, a three-dimensional image can be provided to the viewers 10 and 20 at different viewing positions.

The bottom electrodes 81 and 82 of the polarization-controlled liquid crystal panel 7 have comb-like shapes, and the bottom electrodes 81 and 82 are disposed on the bottom substrate 71 so that the strip electrodes 81a and 82a interlock one another. Similarly, the top electrodes 83 and 84 have comb-like shapes, and the top electrodes 83 and 84 are disposed on the top substrate 72 so that the strip electrodes 83a and 84a interlock one another. Therefore, two electrodes to which different voltages are applied can be fabricated using a single electrically-conductive layer on each substrate, and hence the polarization-controlled liquid crystal panel 7 can be easily fabricated. The pitch at which the strip electrodes are arranged can be easily reduced.

Since the drive circuit 100 for controlling the polarization-controlled liquid crystal panel 7 includes a combination of a simple known electrical circuit including the oscillation circuit 110, the frequency dividing circuit 120, and a logic circuit, the drive circuit 100 can be easily fabricated.

Next, a specific example of an electronic apparatus to which the image display device of the first embodiment is applicable will be described with reference to FIG. 17.

The case where the image display device of the first embodiment is applied to a display unit of a cellular phone will be described. FIG. 17 is a perspective view of the structure of the cellular phone. As shown in FIG. 17, a cellular phone 200 includes a plurality of operation buttons 201, an earpiece 202, a mouthpiece 203, and a display unit 204 to which the image display device of the first embodiment is applied.

Figure 17:
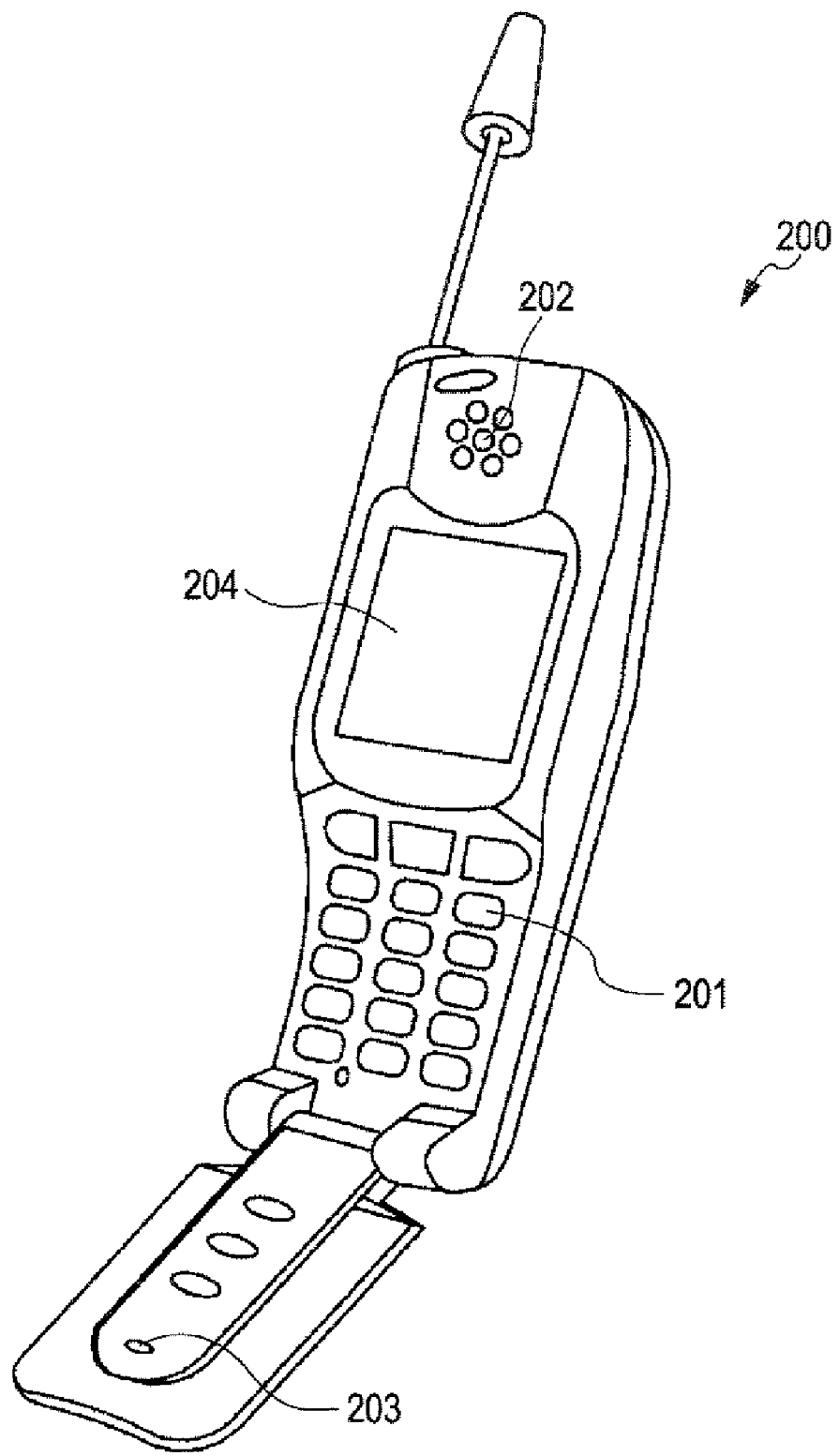
FIG. 17 is a perspective view showing the structure of a cellular phone.

Electronic apparatuses to which the image display device of the first embodiment is applicable include, besides the cellular phone shown in FIG. 17, a personal computer, a liquid crystal television, a viewfinder-/monitor-direct-view-type video tape recorder, a car navigation apparatus, a pager, an electronic notebook, an electronic calculator, a word-processor, a workstation, a videophone, a point-of-sale (POS) terminal, a digital still camera, or the like.

Second Embodiment

A second embodiment of the invention will be described with reference to FIGS. 18 and 19A to 19D.

An image display device of the second embodiment differs from the image display device 1 of the first embodiment only in the structure of the drive circuit 100. In the second embodiment, components similar to those of the image display device 1 of the first embodiment are given the same reference numerals, and repeated descriptions thereof will be omitted appropriately.

The image display device 1 of the second embodiment has three image display modes, namely, the dual-screen display mode in which different images are provided to the viewers 10 and 20 residing at different viewing positions, the three-dimensional image display mode in which a three-dimensional image is provided to the viewers 10 and 20, and the two-dimensional image display mode in which one and the same two-dimensional image is provided to the viewers 10 and 20. By switching among these image display modes, the image display device 1 can provide images in various modes. The dual-screen display mode of the second embodiment differs from the first embodiment in that it has two modes, namely, a first dual-screen display mode in which the image L2 is provided to the viewer 10 and simultaneously the image R2 is provided to the viewer 20, and a second dual-screen display mode in which, in contrast to the first dual-screen display mode, the image R2 is provided to the viewer 10 and simultaneously the image L2 is provided to the viewer 20. In the second embodiment, the first and second dual-screen display modes are switched.

Figure 18:
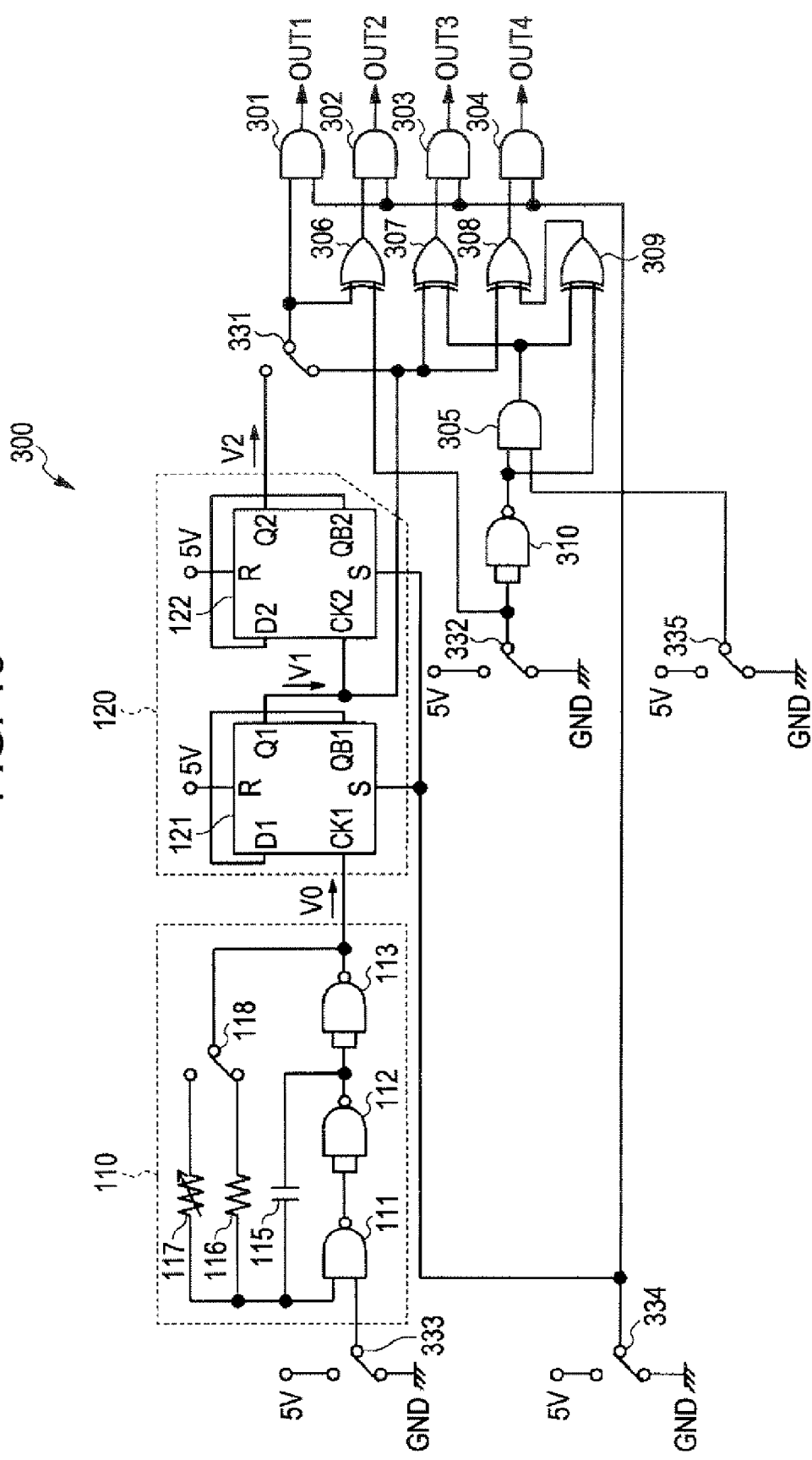
FIG. 18 is an electrical circuit diagram of a control circuit according to a second embodiment.

The structure and operation of a drive circuit 300 for controlling the polarization-controlled liquid crystal panel 7 of the second embodiment will be described. FIG. 18 is an electrical circuit diagram of the control circuit, and FIGS. 19A to 19D are timing charts for describing voltages output from output ends.

The drive circuit 300 includes the oscillation circuit 110, the frequency dividing circuit 120, AND circuits 301 to 305, XOR circuits 306 to 309, a NAND circuit 310, and switches 331 to 335. Output ends OUT1 to OUT4 are connected to the bottom electrodes 81 and 82 and the top electrodes 83 and 84, respectively.

The switches 332, 333, 334, and 335 each have two (first and second) input ends, which are connected to supply voltage 5V and ground potential GND, respectively. An output end of the switch 332 is connected to two (first and second) input ends of the NAND circuit 310 and a first input end of the XOR circuit 306. An output end of the switch 333 is connected to the oscillation circuit 110. An output end of the switch 334 is connected to the frequency dividing circuit 120 and first input ends of the AND circuits 301 to 304. An output end of the switch 335 is connected to a first input end of the AND circuit 305. An output end of the switch 331 is connected to a second input end of the AND circuit 301 and a second input end of the XOR circuit 306.

The switches 331 to 335 are switched so that the output ends thereof are selectively connected to one of two (first and second) input ends thereof on the basis of a switching signal from the controller 30.

The oscillation circuit 110 is, as in the first embodiment, a CR oscillation circuit. By supplying the supply voltage 5V from the switch 333 to the NAND circuit 111, the oscillation circuit 110 outputs a clock signal V0. The frequency of the clock signal V0 output from the oscillation circuit 110 is selected from two different frequencies determined by the resistances of the resistors 116 and 117 depending on whether the switch 118 is connected to the resistor 116 or the resistor 117. The switch 118 is switched so that the switch 118 is connected to one of the two resistors 116 and 117 on the basis of a switching signal from the controller 30.

The frequency dividing circuit 120 has, as in the first embodiment, the two D-type flip flops (hereinafter referred to as "DFFs") 121 and 122. Of the first DFF 121, the clock input terminal CK1 is connected to the output of the oscillation circuit 110, and the non-inverted output terminal QB1 is connected to the input terminal D1. The first DFF 121 outputs, from the output terminal Q1, the clock sign V1 at a frequency half the frequency of the clock signal V0 input from the oscillation circuit 110. The first DFF 121 divides the frequency of the clock signal V0 by two to obtain the clock signal V1 having a rectangular wave with a duty ratio of 50%.

Of the second DFF 122, the clock input terminal CK2 is connected to the output terminal Q1 of the first DFF 121, and the non-inverted output terminal QB2 is connected to the input terminal D2. The second DFF 122 outputs, from the output terminal Q2, the clock signal V2 at a frequency half the frequency of the clock signal V1 input from the first DFF 121.

The output terminal Q1 of the first DFF 121 is connected to the first input end of the switch 331 and first input ends of the XOR circuits 307 and 308. The output terminal Q2 of the second DFF 122 is connected to the second input end of the switch 331.

An output end of the NAND circuit 310 is connected to a second input end of the AND circuit 305 and a first input end of the XOR circuit 309. An output end of the AND circuit 305 is connected to second input ends of the XOR circuits 307 and 309. An output end of the XOR circuit 309 is connected to a second input end of the XOR circuit 308. Output ends of the XOR circuits 306 to 308 are connected to second input ends of the AND circuits 302 to 304, respectively.

Output ends of the four AND circuits 301 to 304 are connected to the output ends OUT1 to OUT4, respectively. The output ends OUT1 to OUT4 are connected to the bottom electrodes 81 and 82 and the top electrodes 83 and 84, respectively. Clock signals output from the AND circuits 301 to 304 are output to the bottom electrodes 81 and 82 and the top electrodes 83 and 84, respectively.

The operation of the drive circuit 300 and the waveforms of voltages output from the drive circuit 300 to the bottom electrodes 81 and 82 and the top electrodes 83 and 84 will be described.

Figure 19A:
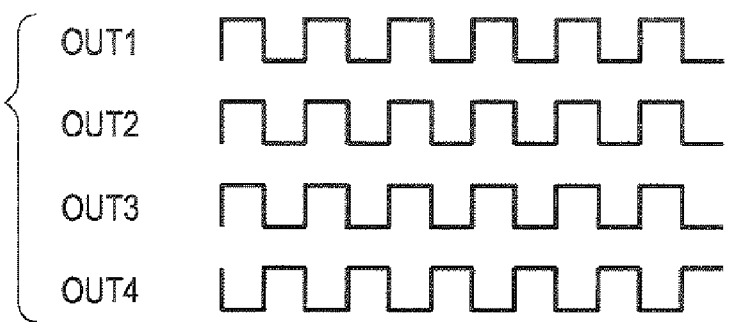
FIGS. 19A to 19D are timing charts for describing voltages output from output ends according to the second embodiment.

In the first dual-screen display mode, on the basis of a switching signal from the controller 30, the input end of the switch 118 is connected to the resistor 116, the input end of the switch 331 is connected to the output terminal Q1 of the first DFF 121, and the input ends of the switches 332 and 335 are connected to the ground potential GND. The input ends of the switches 333 and 334 are connected to the supply voltage 5V. Therefore, as shown in FIG. 19A, the output ends OUT1, OUT2, and OUT3 output the clock signal V1 output from the output terminal Q1 of the first DFF 121, whereas the output end OUT4 outputs an inverted signal of the clock signal V1, which is inverted by the XOR circuit 308.

Figure 19B:
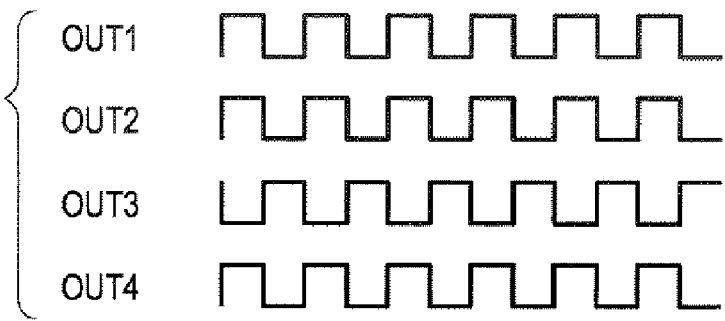

In the second dual-screen display mode, on the basis of a switching signal from the controller 30, the input end of the switch 118 is connected to the resistor 116, the input end of the switch 331 is connected to the output terminal Q1 of the first DFF 121, and the input end of the switch 332 is connected to the ground potential GND. The input ends of the switches 333, 334, and 335 are connected to the supply voltage 5V. Therefore, as shown in FIG. 19B, the output ends OUT1, OUT2, and OUT4 output the clock signal V1 output from the output terminal Q1 of the first DFF 121, whereas the output end OUT3 outputs an inverted signal of the clock signal V1, which is inverted by the XOR circuit 307.

That is, the drive circuit 300 applies voltages to the top electrodes 83 and 84 so that the adjacent strip electrodes 83a and 84a of the top electrodes 83 and 84 have opposite phases, and the drive circuit 300 applies, to the bottom electrodes 81 and 82, a voltage having the same phase as one of the voltages applied to the top electrodes 83 and 84. Therefore, a potential difference is generated between the strip electrodes 84a and the strip electrodes 81a and 82a facing the strip electrodes 84a in the first dual-screen display mode. This is the same as the case of the dual-screen display mode of the first embodiment. In the second dual-screen display mode, a potential difference is generated between the strip electrodes 83a and the strip electrodes 81a and 82a facing the strip electrodes 83a. Hence, the polarization-controlled areas 7a and 7b are alternately formed every two unit areas 7c of the polarization-controlled liquid crystal panel 7. The unit areas 7c in which the polarization-controlled areas 7a and 7b are formed are inverted in position between the first and second dual-screen display modes.

Figure 19C:
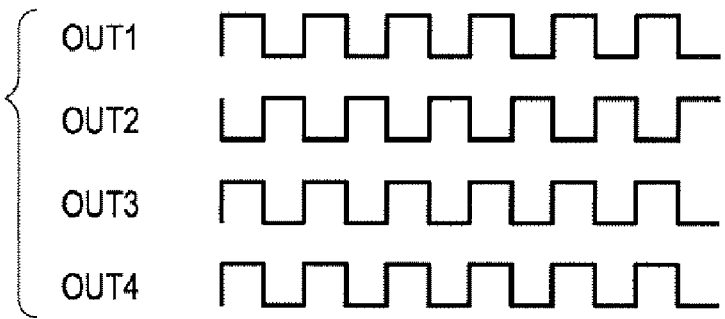

In the three-dimensional image display mode, on the basis of a switching signal from the controller 30, the input end of the switch 118 is connected to the resistor 116, the input end of the switch 331 is connected to the output terminal Q1 of the first DFF 121, and the input ends of the switches 332, 333, and 334 are connected to the supply voltage 5V. The input end of the switch 335 is connected to the ground potential GND. Therefore, as shown in FIG. 19C, the output ends OUT1, OUT3, and OUT4 output the clock signal V1 output from the output terminal Q1 of the first DFF 121, whereas the output end OUT2 outputs an inverted signal of the clock signal V1, which is inverted by the XOR circuit 306.

That is, the drive circuit 300 applies, as in the first embodiment, voltages to the bottom electrodes 81 and 82 so that the adjacent strip electrodes 81a and 82a of the bottom electrodes 81 and 82 have opposite phases, and the drive circuit 300 applies, to the top electrodes 83 and 84, a voltage having the same phase as one of the voltages applied to the bottom electrodes 81 and 82. Therefore, a potential difference is generated between the bottom electrode 82 and the top electrodes 83 and 84 facing the bottom electrode 82, and, the polarization-controlled areas 7a and 7b are alternately formed every unit area 7c of the polarization-controlled liquid crystal panel 7.

Figure 19D:
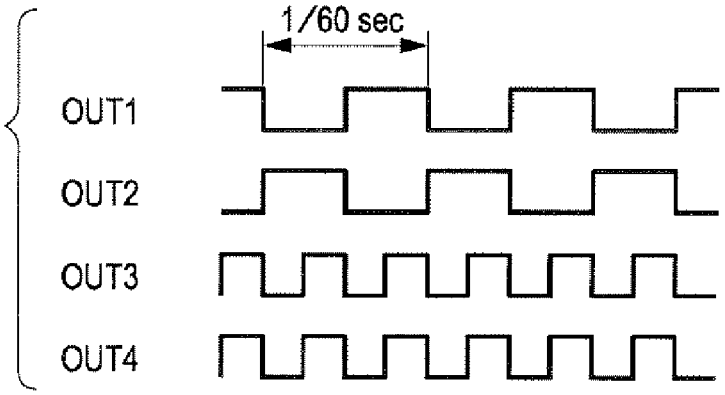

In the two-dimensional image display mode, on the basis of a switching signal from the controller 30, the input end of the switch 118 is connected to the resistor 117, the input end of the switch 331 is connected to the output terminal Q2 of the second DFF 122, and the input end of the switch 332 is connected to the supply voltage 5V. The input ends of the switches 333 and 334 are connected to the supply voltage 5V. The input end of the switch 335 is connected to the ground potential GND. Therefore, as shown in FIG. 19D, the output ends OUT3 and OUT4 output the clock signal V1 output from the output terminal Q1 of the first DFF 121. The output end OUT1 outputs the clock signal V2 output from the output terminal Q2 of the second DFF 122. The output end OUT2 outputs an inverted signal of the clock signal V2, which is inverted by the XOR circuit 306.

That is, the drive circuit 300 applies, as in the first embodiment, voltages to the bottom electrodes 81 and 82 so that the adjacent strip electrodes 81a and 82a of the bottom electrodes 81 and 82 have opposite phases, and the drive circuit 300 applies, to the top electrodes 83 and 84, voltages having a period half that of the voltages applied to the bottom electrodes 81 and 82. Therefore, a potential difference is alternately and periodically generated between the bottom electrode 81 and the top electrodes 83 and 84 and between the bottom electrode 82 and the top electrodes 83 and 84. Thus, the polarization-controlled areas 7a and 7b are alternately formed every unit area 7c of the polarization-controlled liquid crystal panel 7, and the polarization-controlled areas 7a and 7b are periodically and alternatively switched. The period during which the polarization-controlled areas 7a and 7b are switched is four times the period of the clock signal V0 determined by the resistor 117 of the oscillation circuit 110 and is 1/60 seconds in the second embodiment.

Next, the operation of the image display device 1 of the second embodiment will be described in detail.

Since the operation of the image display device 1 of the second embodiment is the same as that of the first embodiment except for the operation in the second dual-screen display mode, a repeated description thereof will be omitted.

First Dual-Screen Display Mode

Since the first dual-screen display mode is the same as the dual-screen display mode of the first embodiment, a repeated description thereof is omitted. In the first dual-screen display mode, as has been described above, by supplying image signals from the controller 30 to the display panel 2, two different images, namely, the image L2 and the image R2, are simultaneously displayed on the display panel 2. However, the light directed to the viewer 10 only passes through the pixel rows 2a of the display panel 2 displaying the image L2, and the light directed to the viewer 20 only passes through the pixel rows 2b of the display panel 2 displaying the image R2. Thus, only the image L2 is viewed by the viewer 10, whereas only the image R2 is viewed by the viewer 20.

Second Dual-Screen Display Mode

In the second dual-screen display mode, image data supplied from the external device to the controller 30 is the same as that in the first dual-screen display mode. The image signals supplied from the controller 30 to the display panel 2 are the same as those in the first dual-screen display mode. Therefore, as shown in FIG. 10, in the second dual-screen display mode, the image L2 is displayed in the pixel rows 2a of the display panel 2, and the image R2 is displayed in the pixel rows 2b of the display panel 2.

By giving an image display mode switching command from the external device to the controller 30, the output from the drive circuit 300 is switched, and the unit areas 7c in which the polarization-controlled areas 7a and 7b of the polarization-controlled liquid crystal panel 7 are formed are inverted in position from those in the first dual-screen display mode.

With this structure, light emitted from the backlight 5 is routed to the polarization plate 6, which is disposed on the side of the backlight 5 facing the viewers 10 and 20, and only light with the first polarization axis is allowed to pass through the polarization plate 6 toward the polarization-controlled liquid crystal panel 7. The light with the first polarization axis passes through the polarization-controlled areas 7a and 7b of the polarization-controlled liquid crystal panel 7. In this case, the light entering the polarization-controlled areas 7a of the polarization-controlled liquid crystal panel 7 is allowed to pass through the polarization-controlled areas 7a without changing the polarization axis. In contrast, the polarization axis of the light entering the polarization-controlled areas 7b of the polarization-controlled liquid crystal panel 7 is changed substantially by 90 degrees, and the light with the second polarization axis exits from the polarization-controlled areas 7b. Thereafter, the light with the first polarization axis, which comes from the polarization-controlled areas 7a, is collected by the lenticular lens 8 so that the light is directed to the viewer 20. The light with the second polarization axis substantially orthogonal to the first polarization axis, which comes from the polarization-controlled areas 7b, is collected by the lenticular lens 8 so that the light is directed to the viewer 10. That is, the polarization axes of the light beams directed to the viewers 10 and 20 are switched from those in the first dual-screen display mode.

The light with the first polarization axis, which is directed to the viewer 20, enters the retardation film 9 having the transmissive areas 9a and the polarization areas 9b. The light with the first polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the second polarization axis exits from the polarization areas 9b. Thereafter, the light with the first polarization axis, which comes from the transmissive areas 9a of the retardation film 9 and which is directed to the viewer 20, enters the polarization plate 4 disposed between the display panel 2 and the retardation film 9, passes through the polarization plate 4, and enters the pixel rows 2a of the display panel 2. In contrast, the light with the second polarization axis substantially orthogonal to the first polarization axis, which comes from the polarization areas 9b of the retardation film 9 and which is directed to the viewer 20, enters the polarization plate 4 disposed between the display panel 2 and the retardation film 9 and is absorbed by the polarization plate 4. Thus, no light passing through the pixel rows 2b of the display panel 2 displaying the image R2 reaches the viewer 20, and the viewer 20 cannot see the image R2 displayed in the pixel rows 2b of the display panel 2. Accordingly, the viewer 20 can see only the image L2 displayed in the pixel rows 2a of the display panel 2.

The light with the second polarization axis, which is directed to the viewer 10, enters the retardation film 9 having the transmissive areas 9a and the polarization areas 9b. The light with the second polarization axis substantially orthogonal to the first polarization axis passes through the transmissive areas 9a and the polarization areas 9b of the retardation film 9. In this case, the light passing through the transmissive areas 9a of the retardation film 9 is allowed to pass through the transmissive areas 9a without changing the polarization axis. In contrast, the polarization axis of the light entering the polarization areas 9b is changed substantially by 90 degrees, and the light with the first polarization axis exits from the polarization areas 9b. Thereafter, the light with the second polarization axis substantially orthogonal to the first polarization axis, which comes from the transmissive areas 9a of the retardation film 9 and which is directed to the viewer 10, enters the polarization plate 4 disposed between the display panel 2 and the retardation film 9 and is absorbed by the polarization plate 4. Thus, no light passing through the pixel rows 2a of the display panel 2 displaying the image L2 reaches the viewer 10, and the viewer 10 cannot see the image L2 displayed in the pixel rows 2a of the display panel 2. In contrast, the light with the first polarization axis, which comes from the polarization areas 9b of the retardation film 9 and which is directed to the viewer 10, enters the polarization plate 4 disposed between the display panel 2 and the retardation film 9, passes through the polarization plate 4, and enters the pixel rows 2b of the display panel 2. Accordingly, the viewer 10 can see only the image R2 displayed in the pixel rows 2b of the display panel 2.

That is, the image display device 1 of the second embodiment provides only the image L2 to the viewer 10 and only the image R2 to the viewer 20 in the first dual-screen display mode. In the second dual-screen display mode, the image display device 1 provides only the image R2 to the viewer 10 and only the image L2 to the viewer 20.

The image display device 1 of the second embodiment described above has the following advantages.

In the image display device 1 of the second embodiment, images provided to the viewers 10 and 20 at different viewing positions can be switched by changing the manner in which the polarization-controlled liquid crystal panel 7 is controlled, without changing the image data input from the external device to the controller 30 or the image signals supplied from the controller 30 to the display panel 2. That is, the directions in which images are displayed can be switched.

For example, when similarly switching the directions in which images are provided, a known dual-screen display device using a parallax barrier involves switching the positions at which the images L2 and R2 are displayed. Therefore, in the known dual-screen display device, the input image data needs to be re-rendered and new image signals need to be generated every time the positions at which images are displayed are switched. When switching the directions in which images are displayed, it requires time for the known dual-screen display device to re-render the image data, resulting in a delay in displaying images. To prevent the delay in displaying images, an additional memory is necessary, which leads to an increase in the cost of the display device.

However, in the image display device 1 of the second embodiment, the images provided to the viewers 10 and 20 at different viewing positions can be switched instantly without needing to switch the positions at which the images L2 and R2 are displayed. As a result, no delay occurs in displaying the images upon the switching operation. Therefore, the viewers 10 and 20 can view the images L2 and R2 in a more comfortable manner. There is no need to have an additional memory, and the image display device 1 can be fabricated at low cost.

In the second embodiment, the first and second dual-screen display modes of the image display device 1 are switched by giving an image display mode switching command from the external device to the controller 30. However, the display mode switching is not limited thereto. For example, the first and second dual-screen display modes may be sequentially switched every predetermined time using a timer.

The other advantages of the second embodiment and the structure of an electronic apparatus are the same as those of the first embodiment.

The invention is not limited to the embodiments described above. Various changes, alterations, and modifications are possible without departing from the scope of the invention set forth in claims and the entire specification.

What is claimed is:

1. An image display device comprising:
   a display panel that has a plurality of pixels arranged in a predetermined first direction and in a second direction intersecting with the first direction;
   a light source that emits light to the display panel;
   a controller;
   a polarization axis controller that separates the light emitted from the light source into light with a first polarization axis and light with a second polarization axis different from the first polarization axis, the polarization axis controller being disposed between the display panel and the light source; and
   an optical element that directs the light emitted from the light source in a direction substantially orthogonal to the first direction, the optical element being disposed between the display panel and the polarization axis controller,
   wherein the polarization axis controller includes
      a first substrate,
      a second substrate,
      a liquid crystal layer held between the first substrate and the second substrate,
      a plurality of first electrodes disposed on the first substrate so as to extend in the first direction, the plurality of first electrodes being arranged at a predetermined interval in the second direction, and
      a plurality of second electrodes disposed on the second substrate so as to extend in the first direction, the plurality of second electrodes being arranged at an interval twice the predetermined interval in the second direction,
   wherein the plurality of second electrodes is disposed so as to overlap at least part of the adjacent first electrodes,
   wherein the controller switches an image display mode between a dual-screen display mode and a three-dimensional image display mode by controlling voltages applied to the plurality of first electrodes and the plurality of second electrodes,
   wherein in the dual-screen display mode, the controller applies voltages to the plurality of second electrodes so that the adjacent electrodes have opposite phases, and, to the plurality of first electrodes, applies a voltage having the same phase as one of the voltages applied to the plurality of second electrodes, and
   wherein in the three-dimensional image display mode, the controller applies voltages to the plurality of first electrodes so that the adjacent electrodes have or opposite phases, and, to the plurality of second electrodes, applies a voltage having the same phase as one of the voltages applied to the plurality of first electrodes.

2. The image display device according to claim 1, wherein the plurality of first electrodes is a plurality of strip electrodes of a pair of comb-like electrodes having a pair of connecting portions disposed along an outer periphery of the first substrate and the plurality of strip electrodes extending alternately from the pair of connecting portions inward of the first substrate, and
   wherein the plurality of second electrodes is a plurality of strip electrodes of a pair of comb-like electrodes having a pair of connecting portions disposed along an outer periphery of the second substrate and the plurality of strip electrodes extending alternately from the pair of connecting portions inward of the second substrate.

3. The image display device according to claim 1, wherein the controller applies the voltages to the plurality of first electrodes so that the adjacent electrodes have opposite phases and, to the second electrodes, applies a voltage with a period half that of the voltages applied to the plurality of first electrodes, thereby switching the image display mode to a two-dimensional image display mode.

4. The image display device according to claim 1, wherein the controller applies the voltages to the plurality of second electrodes so that the adjacent electrodes have opposite phases, and, to the plurality of first electrodes, applies a voltage having the same phase as the other voltage applied to the plurality of second electrodes, thereby switching the image display mode to a second dual-screen display mode.

5. An electronic apparatus comprising an image display device as set forth in claim 1.

* * * * *